May 30, 1939.　　W. S. REYNOLDS　　2,160,518
PACKAGING MACHINE
Filed May 13, 1937　　13 Sheets-Sheet 11
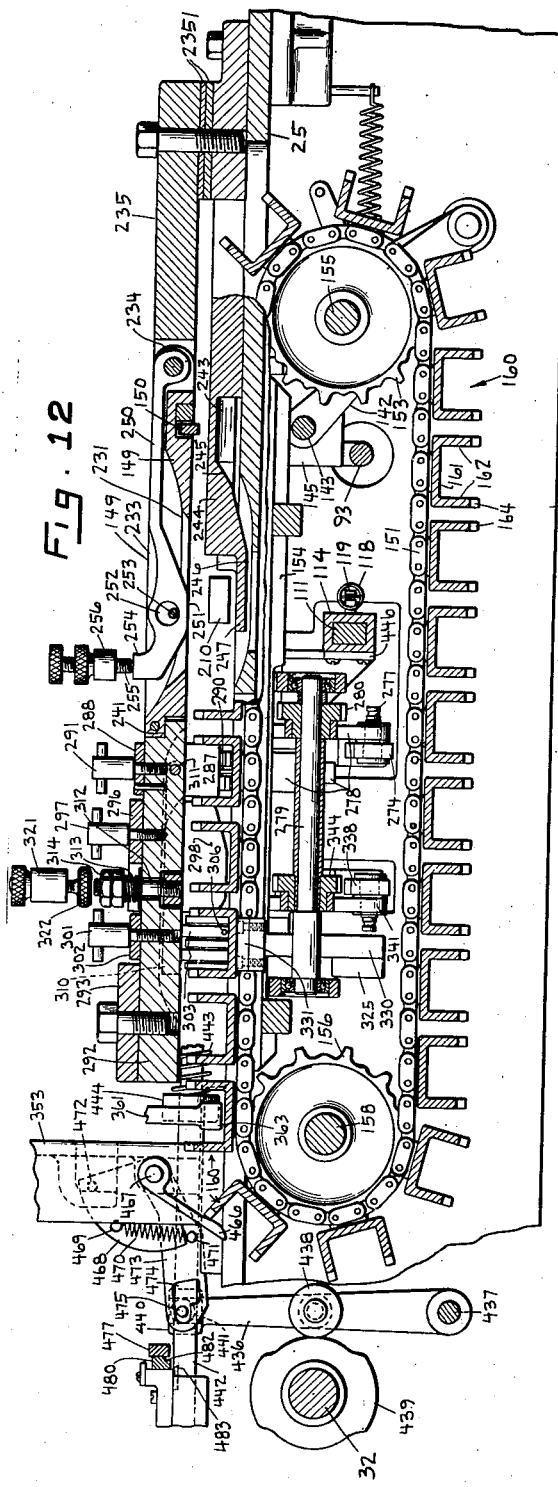
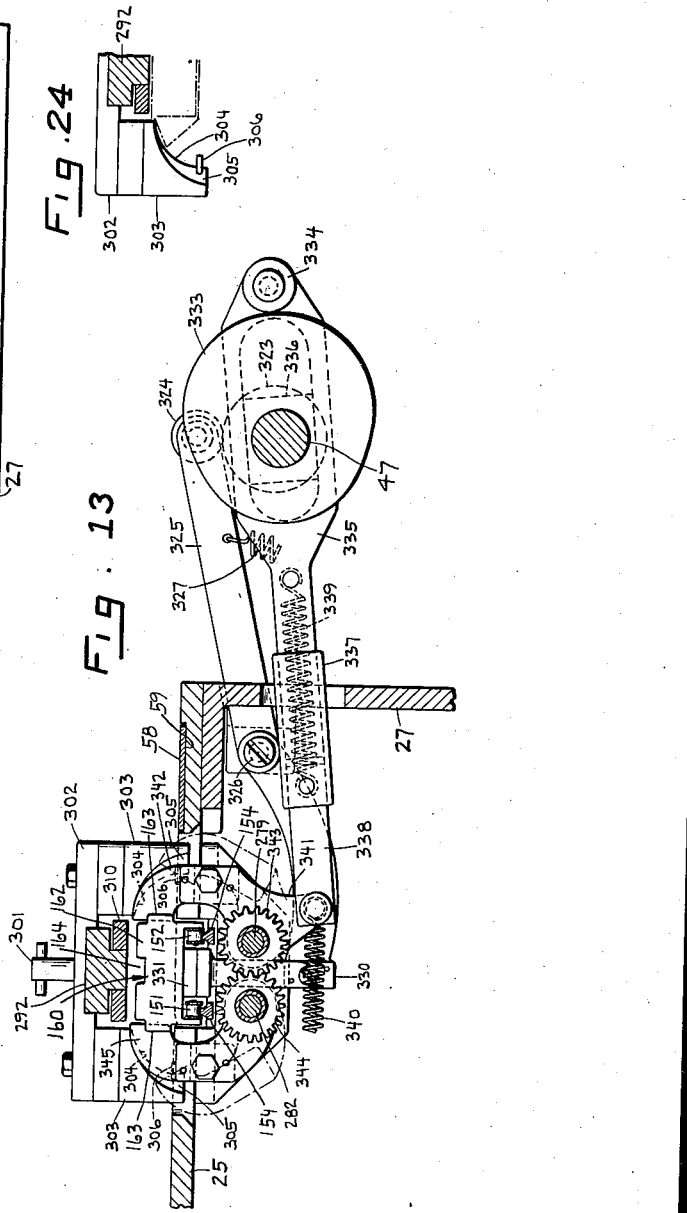
INVENTOR.
WARREN S. REYNOLDS.
BY
ATTORNEY May 30, 1939. W. S. REYNOLDS 2,160,518
PACKAGING MACHINE
Filed May 13, 1937 13 Sheets-Sheet 12
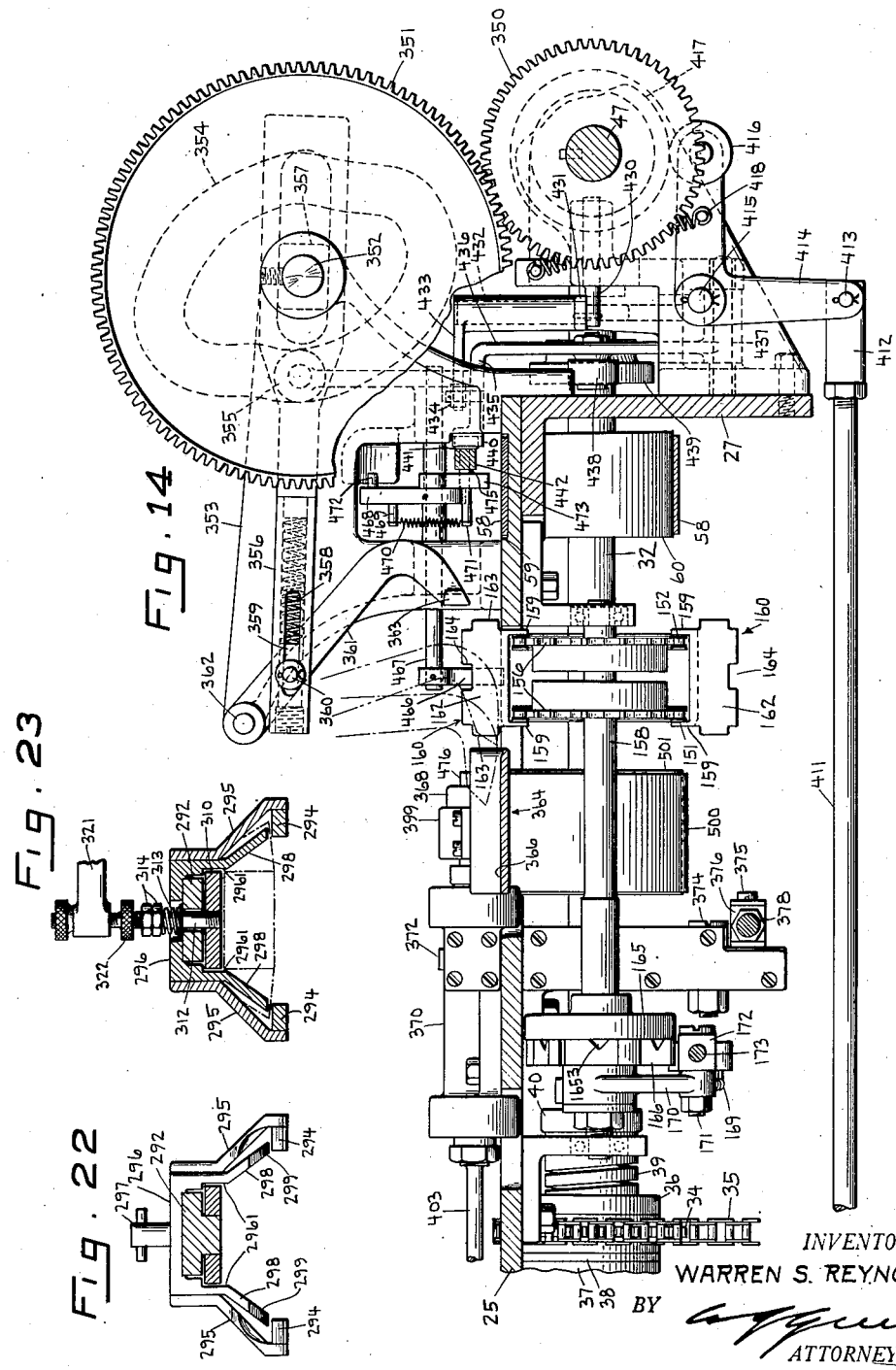
INVENTOR.
WARREN S. REYNOLDS.
BY
ATTORNEY

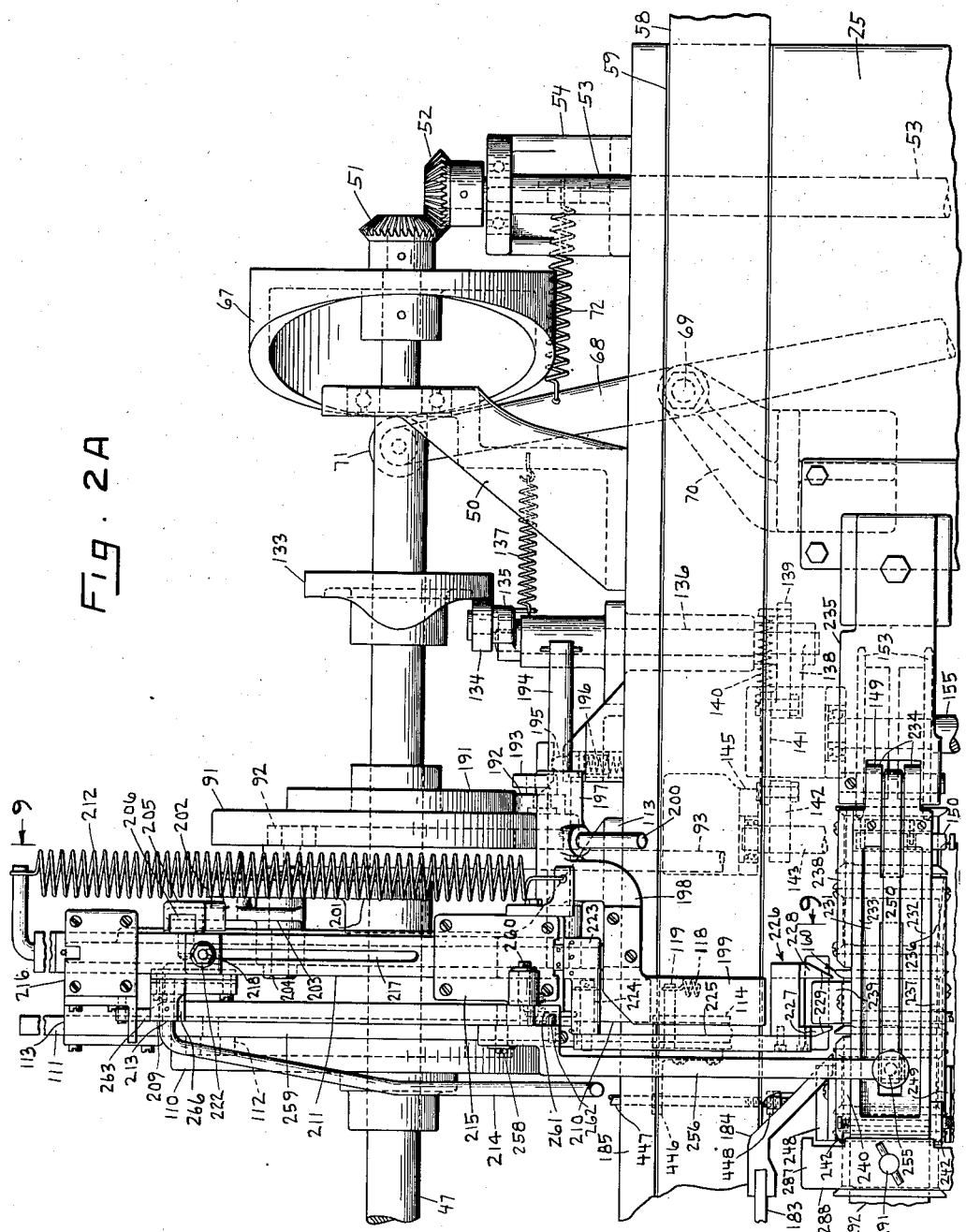

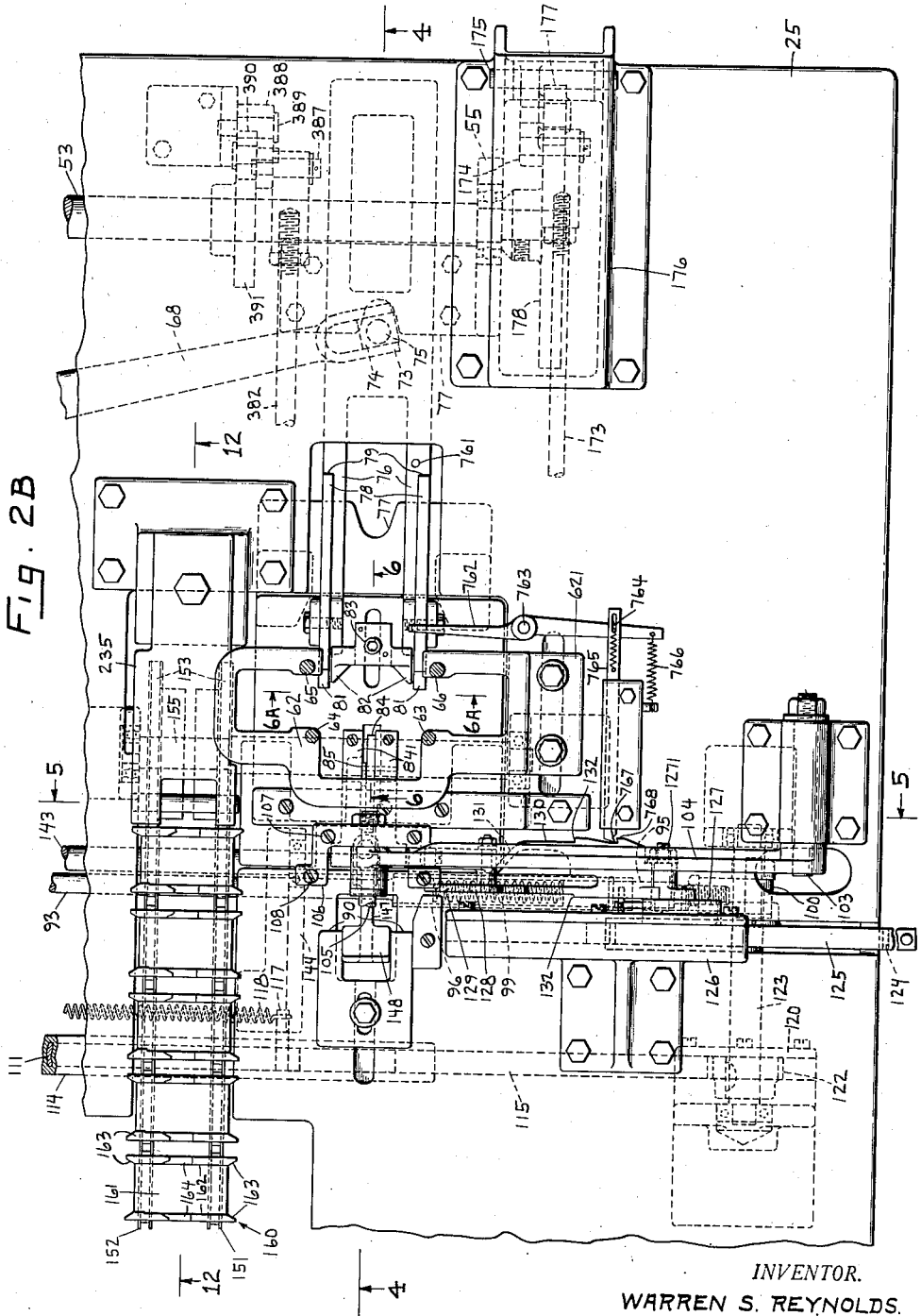

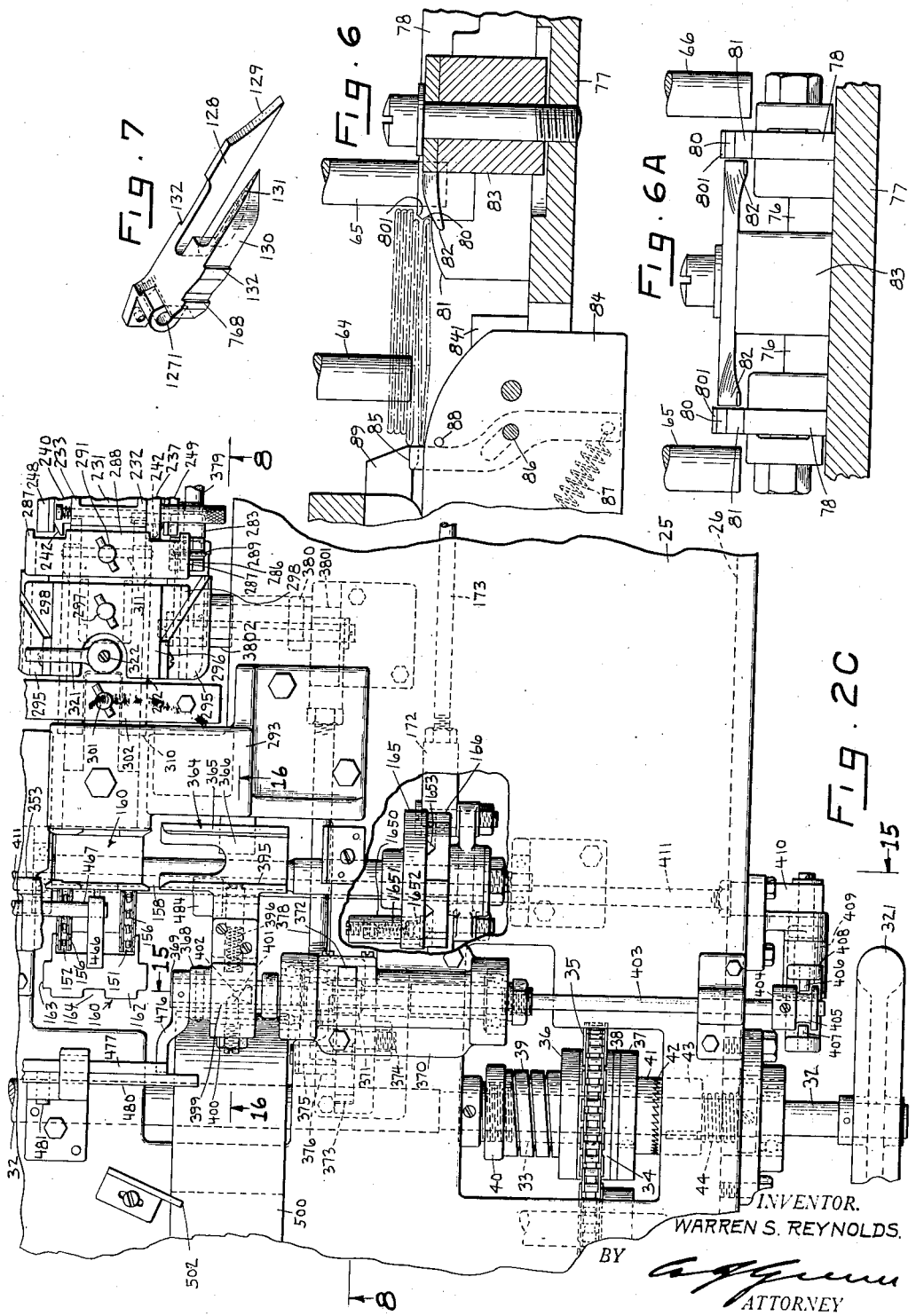

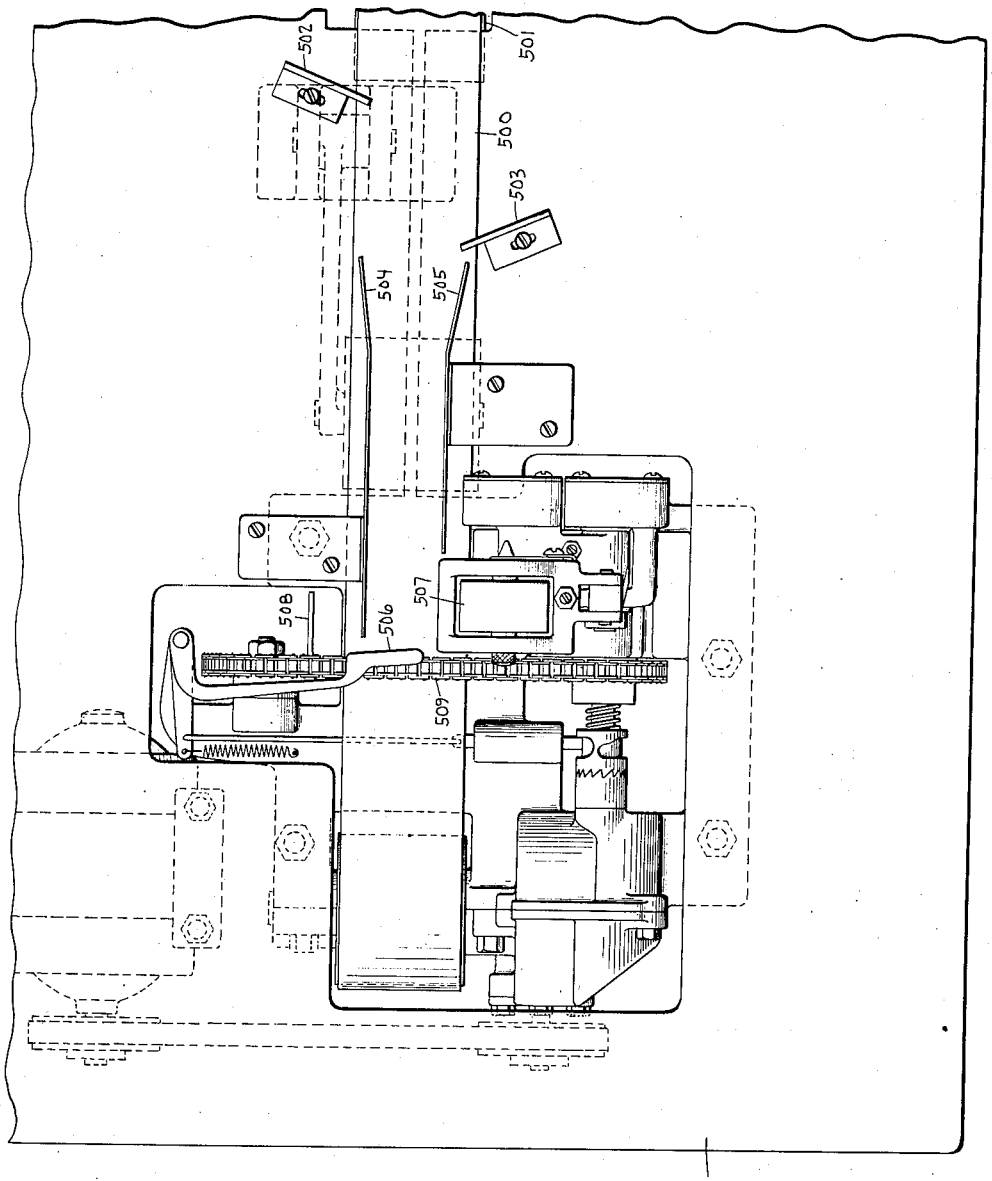

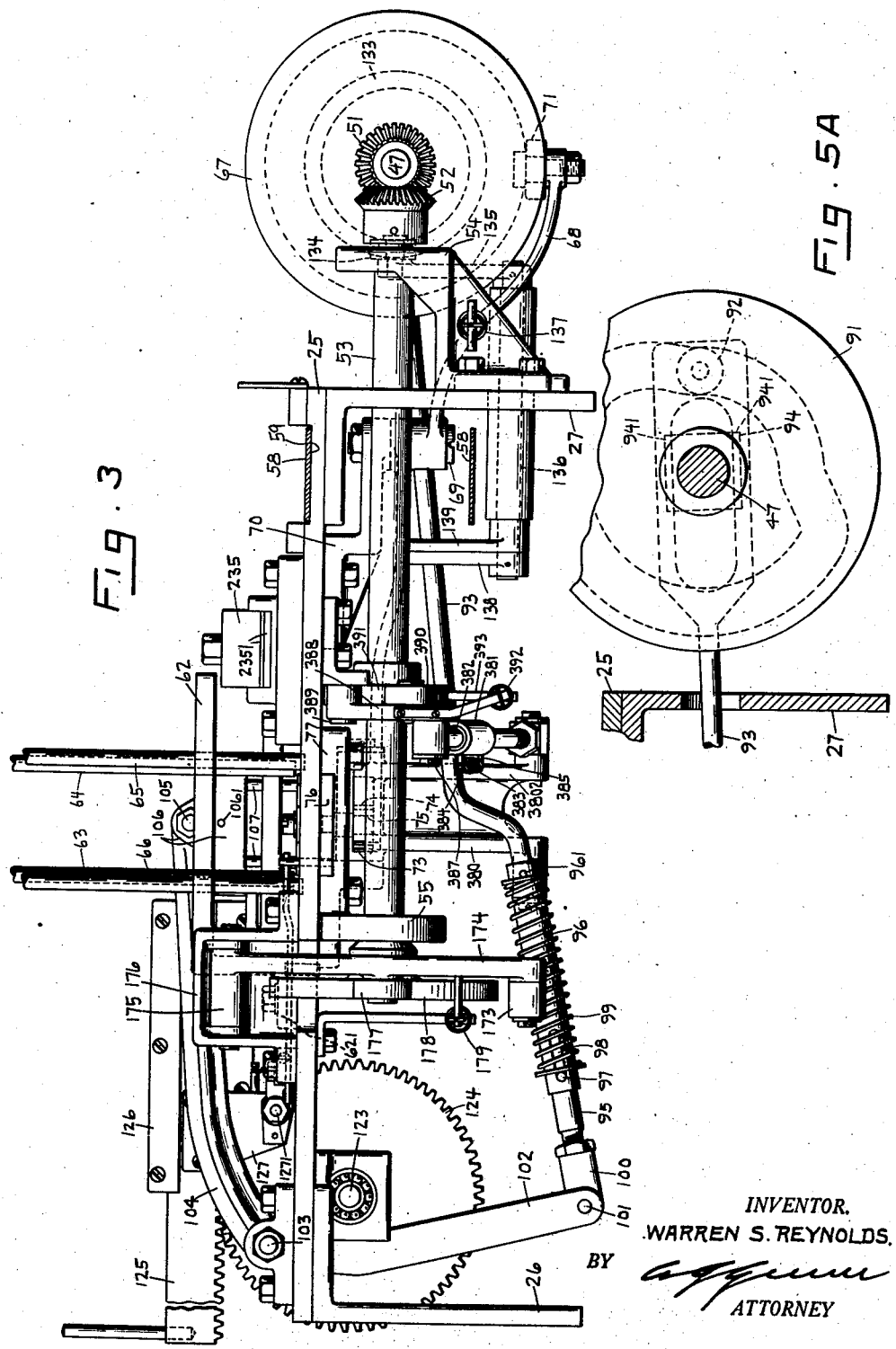

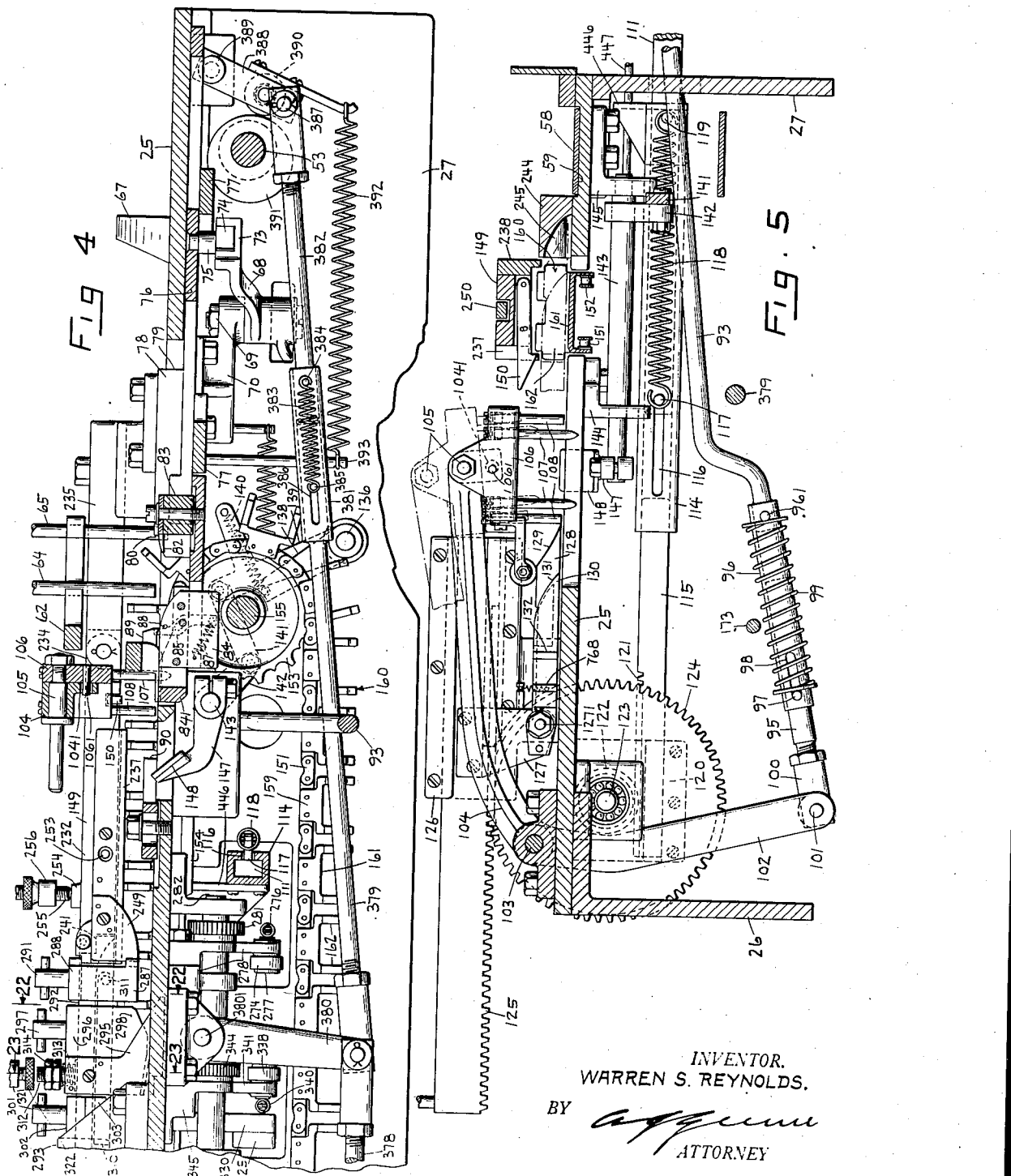

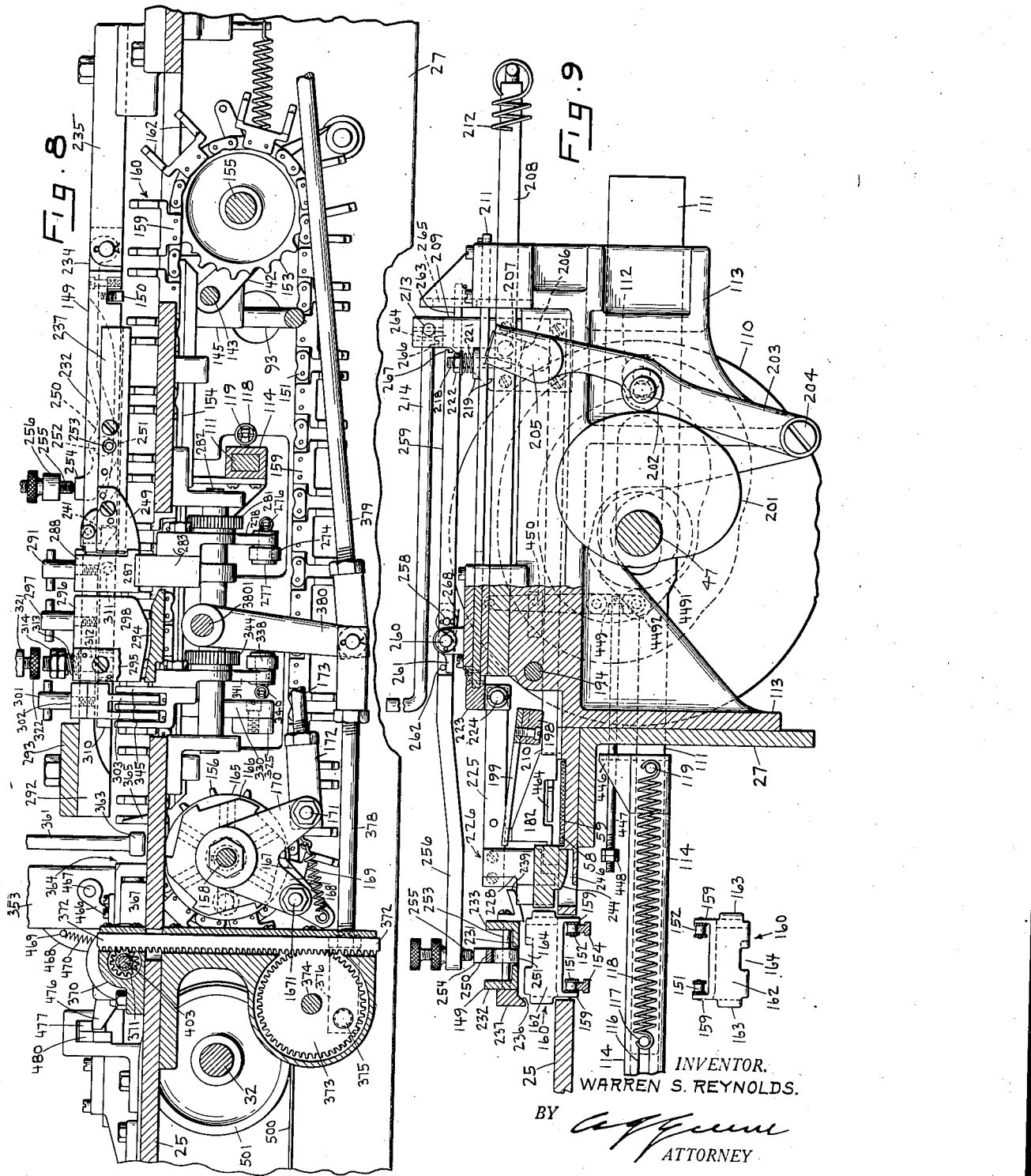

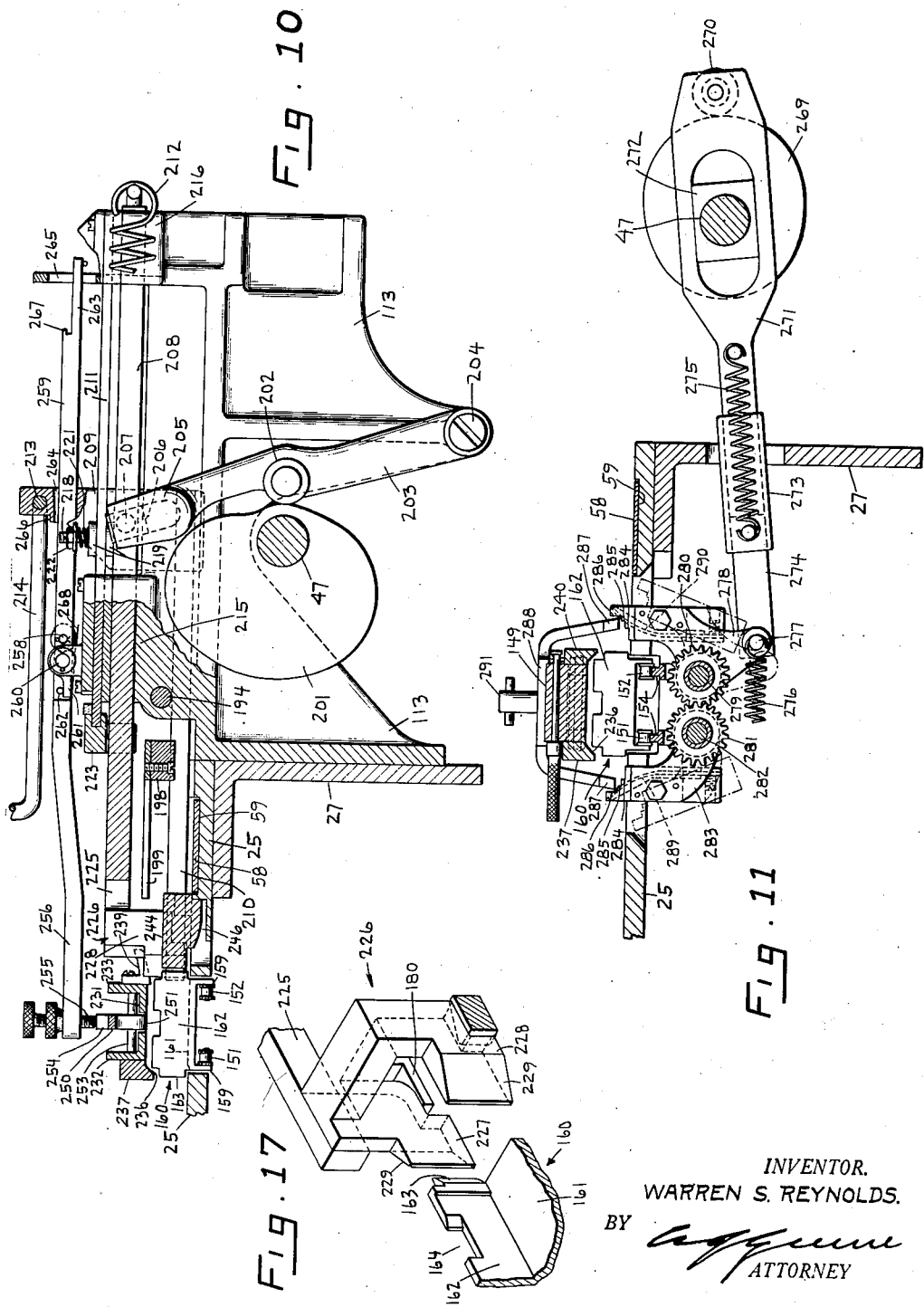

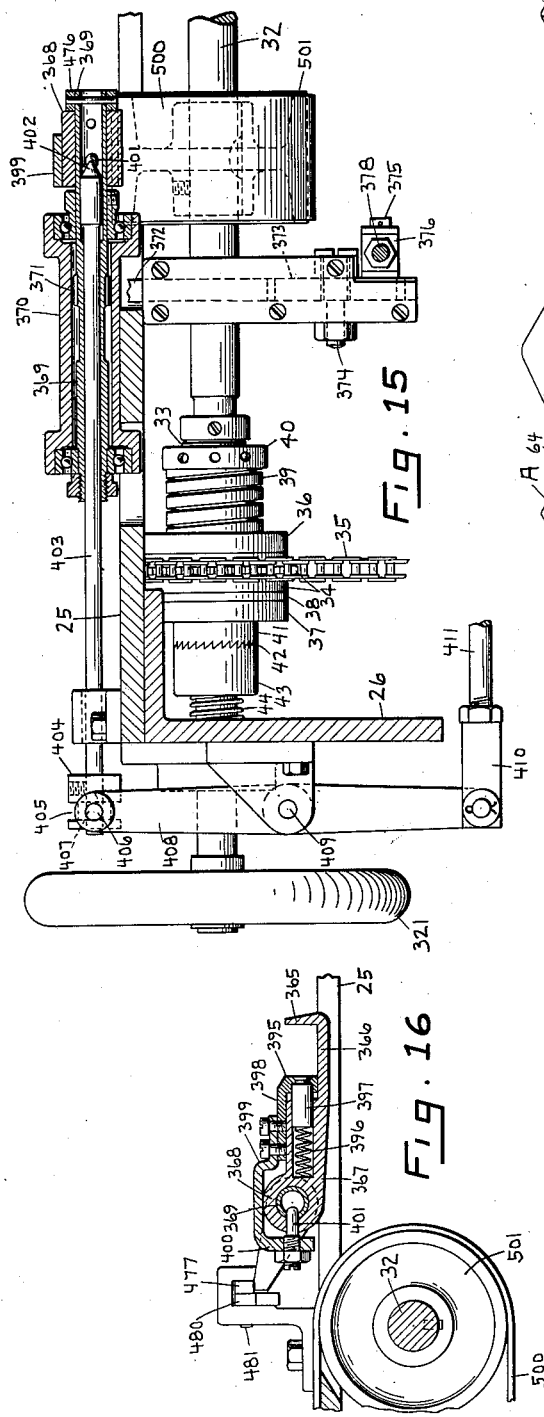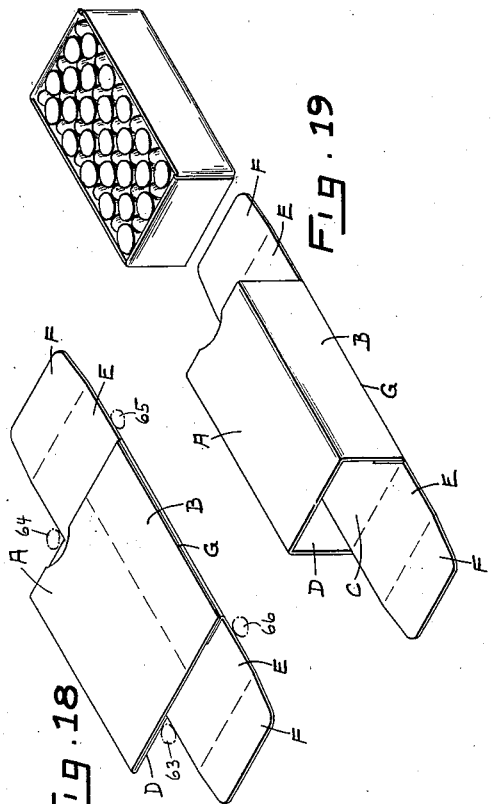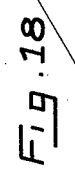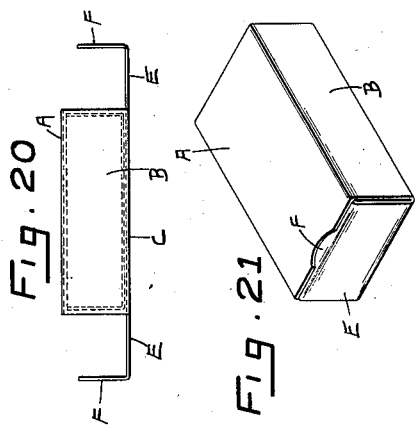

Patented May 30, 1939

2,160,518

UNITED STATES PATENT OFFICE 2,160,518

PACKAGING MACHINE

Warren S. Reynolds, Stratford, Conn., assignor to Remington Arms Company, Inc., a corporation of Delaware Application May 13, 1937, Serial No. 142,391

66 Claims. (Cl. 93—6)

This invention relates to machines for the packaging of various articles, and will be described with particular reference to a machine for completing the packaging of small arms cartridges, although it is to be understood that the invention is directed to the completion of a package without reference to the particular articles contained in the package and that the characteristics of the package itself may vary widely.

As a specific embodiment, a machine will be described for the completion of the packaging of .22 caliber cartridges in a package of the "tray and tube" type. The "tray" is a paper board box with an open top. The "tube" is preferably of paper board folded and pasted to form a continuous piece encircling the top, bottom and sides of the tray, and provided with end flaps adapted to be turned upwardly and inwardly after the insertion of the tray, thus completing the package. The machine contemplates means for receiving loaded trays, and other means for receiving tubes in a folded or flat condition. The flat tubes are stacked in a suitable holder and are removed one at a time from the bottom of the stack. The tube thus removed is opened and shaped to receive the loaded tray, then placed in a feed chain by which it is carried in turn to several operating stations. At one of these stations the loaded tray, which has entered the machine on a feed belt, is inserted through one of the open ends of the tube. The portion of the end·flap which in the finished package extends inwardly above the tray is then bent upwardly with respect to the end flap proper. The end flaps themselves are then bent upwardly, while the inwardly extending parts thereof are guided into the tube above the loaded tray. The package thus completed is then removed from the chain and inverted to enable printing on the bottom thereof of certain identifying data. Substantially all operations of the machine are performed through spring connected parts adapted to yield in the event normal movement is obstructed by the accidental displacement of the materials being operated upon or any other cause. The machine contemplates the packaging of cartridges; hence, it is so constructed that if cartridges are accidentally spilled from a tray or package at any point they will be directed out of the mechanism and safely ejected from the machine. Appliances are also provided for stopping the machine in the event of the malfunctioning or jamming of any parts thereof.

Throughout this description, the term "forward" indicates the direction of movement of the work through the machine. The "front" of the machine is the end from which finished packages are delivered; the "rear" of the machine is the opposite end, and the "left side" is the side to the left of an observer facing the machine at the front end. The "normal" position of reciprocating parts is the retracted position from which they "advance" to perform their functions.

In the drawings:

Fig. 1 is an elevation of the complete machine, looking toward the left.

Figs. 2, 2A, 2B, 2C and 2D together constitute a complete plan view of the machine with the cover removed.

Fig. 2 shows the leftward portion of the machine to the rear of the printer, the mechanism therein having to do particularly with the closing of assembled packages and their removal from the carrier to the printer belt; parts of the tray stopping and transferring devices are likewise included.

Fig. 2A is a plan to the rear of Fig. 2 and may be placed in the proper relation to Fig. 2 by aligning the shaft 47 as shown in these Figs. respectively. Fig. 2A includes the cam and a part of the drive mechanism for the shaping of tubes, the cartridge seating mechanism, and the tray transferring mechanism; as well as a portion of the carrier. Where Figs. 2 and 2A overlap, for greater clearness certain parties shown on each have been omitted from the other.

The mechanism shown in Fig. 2B is located to the right of that shown in Fig. 2A. These figures may be placed in proper relation by aligning the sections of shaft 53.

The mechanism in Fig. 2C is located near the front of the machine, the package inverter being common to Figs. 2 and 2C.

Fig. 3 is a fragmentary elevation of the rear end of the machine.

Fig. 4 is a fragmentary longitudinal elevation, substantially on the line 4—4 of Fig. 2B.

Fig. 5 is a fragmentary transverse sectional elevation, substantially on the line 5—5 of Fig. 2B, showing the parts by which the flat tube is held while being opened, and the mechanism for opening the tube and transferring it to the carrier chain.

Fig. 5A is a detail of the flat tube holding cam and its connections, the parts actuated by said cam being shown in Fig. 5.

Fig. 6 is an enlarged longitudinal sectional detail, substantially on the line 6—6 of Fig. 2B, showing parts of the flat tube storing and moving devices.

Fig. 6A is a transverse sectional elevation of the parts shown in Fig. 6.

Fig. 7 is a perspective of a tube opening and shaping device which will be called the "tube shaper".

Fig. 8 is a fragmentary longitudinal section, substantially on the line 8—8 of Figs. 2 and 2C.

Fig. 9 is a fragmentary transverse sectional elevation substantially on the line 9—9 of Fig. 2A, showing the means for seating cartridges in a tray, detecting the presence of a tube in the carrier, inserting a tray into a tube in the carrier, guiding the tray during this movement, and for performing incidental functions.

Fig. 10 is a skeleton of a part of the mechanism shown in Fig. 9, showing the tray inserting means in advanced position.

Fig. 11 is a transverse detached sectional elevation, substantially on the line 11—11 of Fig. 2, showing the tube flap creasing devices.

Fig. 12 is a longitudinal sectional elevation of the carrier chain substantially on the line 12—12 of Fig. 2.

Fig. 13 is a transverse sectional elevation, substantially on the line 13—13 of Fig. 2, showing the flap closing means and devices for supporting and positioning the tube and tray assembly during the flap closing operation.

Fig. 14 is a transverse section, substantially on the line 14—14 of Fig. 2, showing the "pick-off" mechanism by which completed packages are removed from the carrier chain and placed in the inverter.

Fig. 15 is a detached transverse sectional elevation, showing chiefly operating devices for the gripper which holds packages in the inverter; the section being substantially on the line 15—15 of Fig. 2C.

Fig. 16 is a longitudinal detail section of the inverter and gripper, substantially on the line 16—16 of Fig. 2C.

Fig. 17 is a perspective of a tray guiding and bucket aligning shoe.

Fig. 18 shows a tube in flat condition as received in the machine.

Fig. 19 is a perspective of the tube after being opened to receive a tray, and a loaded tray in assembly relation to the tube.

Fig. 20 is a side view of the tube and tray assembly after the creasing of the end flaps by the devices shown in Fig. 11.

Fig. 21 is a perspective of the finished package.

Fig. 22 is a fragmentary sectional elevation, substantially on the line 22—22 of Fig. 4.

Fig. 23 is a fragmentary sectional elevation, substantially on the line 23—23 of Fig. 4.

Fig. 24 is a fragmentary detail of a yoke for holding end flaps in position for movement to final box-closing position.

Support and drive mechanism

Figure 1:
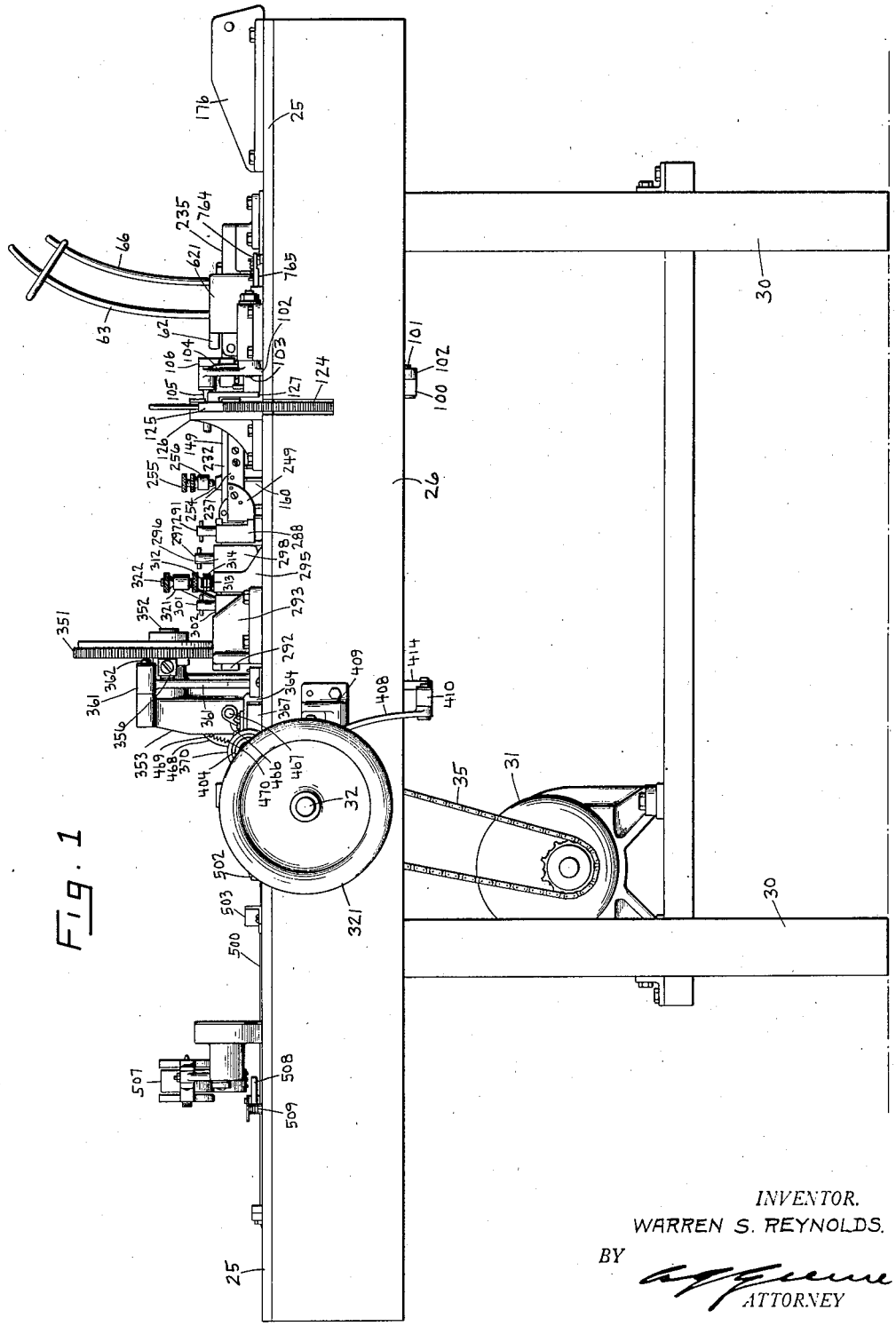

The machine is supported upon a suitable bench or stand of rugged construction, the illustrative embodiment shown in the drawings comprising a flat table 25 having rigidly secured thereto depending side skirts 26 and 27 and end skirts 28 and 29, the whole being supported by suitable uprights, preferably in the form of channels identified by the numeral 30. The source of power is preferably an electric motor identified as 31 suitably supported beneath the table 25. The motor 31 is preferably provided with a sprocket wheel and drives a shaft 32 through mechanism providing both a slip connection and means for moving the shaft by hand which may be constructed as follows, reference being made to Figs. 2C, 14 and 15:

Loosely mounted on shaft 32 is a sleeve 33 upon which rotates a sprocket wheel 34 connected through a sprocket chain 35 to the sprocket wheel on the motor 31. Keyed to sleeve 33 are plates 36 and 37. Interposed between plates 36 and 37 and the hub of sprocket wheel 34 are disks 38 of a suitable friction material, such as leather, and the disks are pressed into frictional engagement with the hub of sprocket wheel 34 by suitable means such as a spring 39 abutting a collar 40 fixed to sleeve 33. Plate 37 is provided with a hub 41 terminating in clutch teeth 42 engaging similar clutch teeth on a collar 43 keyed to the shaft 32 and held in operative position by a suitable spring 44. A hand wheel 321 fixed to the end of shaft 32 enables manual operation of said shaft.

At the end of the shaft 32 opposite the connections to the motor is fixed a bevel gear 45 (Fig. 2) which meshes with a similar bevel gear 46 rotatably held on the main drive shaft 47. Said shaft 47, which is supported in suitable brackets 48, 49 and 50 (Fig. 2A) secured to the skirt 27, extends substantially the length of the left side of the table and at the end opposite bevel gear 46 carries another bevel gear 51 meshing with a bevel gear 52 on a shaft 53 supported in brackets such as 54 and 55 (Fig. 3) secured to the underside of table 25. All parts of the mechanism are moved through appropriate connections to one of the shafts 32, 47 and 53. It will be noted that the shafts are all geared together, thus parts deriving their movement from any one of them can be synchronized with parts moved by any other. Bevel gear 46 is loose on shaft 47 and is connected therewith by a toothed clutch member 56 splined to shaft 47 and urged into engagement with the hub of gear 46 by suitable means such as a spring 57. The purpose and operation of this clutch will hereinafter appear.

Tray receiving mechanism

Trays loaded with the articles to be packaged, such as cartridges, are received at the rear of the machine on a belt 58 (Figs. 2A and 14) which traverses a shallow groove 59 in the top and near the left side of table 25, and passes over a pulley 60 on shaft 32. The loaded trays are carried along by belt 58 to a point where they are aligned with and thrust laterally off said belt into the outer packages or "tubes" in the manner to be hereinafter described.

A tray loaded with "rim" cartridges as received on belt 58 is illustrated in Fig. 19. It should be noted that adjacent cartridges are reversely positioned, the projecting rims of half the cartridges being at the top and each such rim being in contact with the curving noses of the bullets of at least three adjacent cartridges. Any agitation of the tray thus loaded tends to cause the upwardly facing bullets to cam the rims in contact therewith upwardly to an abnormal position above the top of the tray. The machine to be described comprises several devices for replacing cartridges thus displaced prior to or in conjunction with operations in which their correct seating in the tray is desirable or necessary.

Tube storing and selecting

Means are provided for holding a stack of tubes in the flat or collapsed condition illustrated in Fig. 18, in which the top A and one side B are aligned and folded down into contact with the bottom C (Fig. 19) and the opposite side D. Parts which will be termed "end flaps" extend from the ends of the bottom C. Each end flap actually comprises two sections—a section E adjacent the bottom which forms the end of the shaped and closed tube (Fig. 21) and a tip F which in the finished package projects inwardly beneath the top A and above the tray. The flat tube holder or storing device comprises an apertured base 62 (Figs. 2B, 3 and 4) supported above the table on a bracket 621 and upwardly and rearwardly curving rack forming posts 63, 64, 65 and 66, extending from said base and so spaced as to engage the flat tubes in the manner illustrated in Fig. 18, thereby holding a stack of flat tubes in accurately superposed relation. The lowermost tube is supported beneath the apertured base 62 in a manner which will presently appear. The flat tubes are transferred one at a time from the bottom of the stack by a selecting mechanism which may be constructed as follows:

A cam 67 (Figs. 2A and 3) fixed to shaft 47 actuates a lever 68 pivoted at 69 in a bracket 70 supported from table 25. Lever 68 is provided with a cam following roller 71 which is supported on an eccentric portion of a stud fast to the lever, and is held in contact with the surface of cam 67 by suitable means such as a spring 72. The opposite end of lever 68 is formed into a shoe 73 (Figs. 2B and 4) to slidably hold a block 74 apertured to rotatably receive a pin 75 depending from a tube feeding slide 76. Said slide reciprocates in a guide plate 77 secured to the underside of table 25, said table being apertured to permit the alignment of the tube engaging parts of slide 76 with the lowermost tube held in the stack above the table. Said tube engaging parts comprise a pair of bars 78 secured to the slide 76 and abutting forwardly facing shoulders 79 thereon. The forward ends of bars 78 (Fig. 6), which comprise tube engaging cutouts 80 and inclines 801 meeting cutouts 80 in sharp tube separating edges, project by an amount slightly more than the thickness of one flat tube above adjacent upwardly and rearwardly curved surfaces 81 on slide 76. When slide 76 is retracted the rearward edge of the lowermost tube in the stack is supported on the forwardly extending and downwardly inclined fingers 82 of a yoke secured to a post 83 fixed in the guide plate 77 and projecting upwardly through a suitable elongated slot in the slide 76.

The mid-portion of the forward edge of the lowermost tube in the stack is supported on a fixed downwardly and rearwardly inclined member 84 held between fixed supporting blocks 841 having downwardly and rearwardly inclined ends and upper surfaces which extend horizontally flush with the top of table 25. At one side of the support 84 and projecting upwardly in front of the forward edge of the lowermost tube in the stack is a finger 85 comprising an elongated aperture which receives a fixed pivot 86 and is urged upwardly and rearwardly by a suitable spring 87, its movement about pivot 86 being stopped by a stud 88. Above the supports 84 and 841 and spaced therefrom by a distance substantially equal to the thickness of one flat tube is an abutment 89 which, acting in conjunction with the finger 85, prevents the delivery of more than one tube at a time.

Normally the stack of tubes is supported at the front by member 84 and at the rear by fingers 82. As the slide 76 is advanced the curving surfaces 81 thereon slide under the lowermost tube, elevating it slightly (Fig. 6). The edge of this tube is then in position to be engaged in cut-outs 80 of bars 78. The tube is thereby moved forwardly from under the stack, its forward edge engaging and deflecting finger 85, which finger presses the tube upwardly and corrects any tendency of the tube to sag in the middle as it is advanced. The forward movement of more than one tube from beneath the stack is prevented by the abutment 89, and separation of the lowermost tube from the tube above it in the stack is facilitated by incline 801. At the end of the forward movement of the slide 76 the stack of tubes is supported by the upper surfaces of the slide bars 78, and when the slide 76 is retracted to normal position the stack again rests on support 84 and fingers 82. The tube which has been removed from the stack lies on the table with its forward edge contacting an abutment 90, and is in position to be opened. As the slide 76 is retired and during the opening operation said tube is held in this position by mechanism which, as shown in Figs. 2A, 2B, 3 and 5, may be constructed as follows:

A box cam 91 on shaft 47 controls a cam following roller 92 mounted on a link 93. Adjacent the cam the link 93 is widened and the wide portion comprises an elongated aperture to receive a block 94 rotatably mounted on shaft 47 and adapted to slide in the elongated aperture in the link, being held therein by vertically extending flanges 941; thus, shaft 47 guides the movement of the link. Link 93 is joined to a short link 95 by a connection so arranged that the thrust of link 93 is transmitted to link 95 through a spring of sufficient rigidity to normally move the two links together, except for a slight over-movement of link 93 near the end of its advance. For this purpose, link 93 carries a sleeve 96 which slidably receives the end portion of link 95. Studs 97 project laterally from link 95 through slots 98 in sleeve 96, and form an abutment for a spring 99 encircling sleeve 96 and abutting a part, such as one or more studs 961 secured to said sleeve. This connection is typical of many utilized in the machine, whereby obstruction of the normal movement of actuated parts results merely in the temporary compressing of a spring, without injury or undue strain on any of the mechanism. Link 95 has an adjustable connection with a short link 100 which has a pivotal connection at 101 with a downwardly extending arm 102 of a lever having a fixed pivot at 103 and a transversely and substantially horizontally extending arm 104. Pivoted to the arm 104 at 105 is a head 106 from which depend two pairs of pins 107 and 108. When the head 106 descends, pins 108 engage the upper surface of the end flaps of the flat tube which has been positioned for opening in the manner heretofore described, firmly holding the tube against the top of table 25. Pins 107, which are longer than pins 108, pass behind and engage the rearward edge of the tube, thus confining it between said pins and the stop shoulders 90. The pivotal mounting of head 106 on arm 104 insures engagement of both pins 108 with the end flaps, and excessive rotation of said head is prevented by the engagement of a stud 1061 projecting from the head with the margins of a slot 1041 in arm 104.

Tube opening

Two separate trains of mechanism are utilized in the operation of opening tubes and shaping them to tray receiving condition. One of these mechanisms comprises fingers inserted endwise into the tube, while the other comprises a lever engaging the tube laterally. Associated with the tube opening fingers are devices for transferring the opened tubes to a carrier chain. The tube opening mechanism will first be described, then the tube shaping mechanism, and finally the transferring mechanism, which latter is actually a part of the tube opening mechanism.

Mounted on shaft 47 is a box cam 110 (Figs. 2A and 9) which actuates a link 111 provided with a roller 112 engaging the track in box cam 110. Link 111 is widened and slotted to straddle shaft 47 and its outer end is guided in a bracket 113 fixed to the table skirt 27. The inner end of link 111 is received in a sleeve 114 on a link 115, said sleeve being provided with a slot 116 through which projects a pin 117 secured to link 111. Pin 117 receives one end of a spring 118, the opposite end of the spring being supported on a pin 119 projecting from sleeve 114. The spring 118 is of sufficient stiffness to transmit motion for the normal operation of the parts connected to link 115 without distortion. If the movement of said parts is obstructed, movement of the link 111 by its cam merely stretches spring 118 without injury to the mechanism. The inner end of link 115 is supported in a guide 120 and is provided with rack teeth 121 engaging a pinion 122 fixed to a short shaft 123. Shaft 123 carries a gear 124 which engages with a rack 125 guided in a frame 126 secured above the table 25. Depending from rack 125 is a short arm 127. To the lower end of arm 127 is connected by pivot 1271 a member (Fig. 7) comprising a pointed finger 128 adapted to slide over the end flap of the tube which has been positioned to be opened, and to engage beneath the top A of such tube to initiate its opening. As finger 128 advances it thus slides into and opens the tube, the end of the tube top A moving upwardly along surface 129 of the finger as it is opened. The width of the finger 128 is substantially the height of the open tube. Connected to and moving with the finger 128 is a finger 130 having a longitudinally and laterally inclined end 131 which engages within the tube when it has been partially opened by finger 128 and assists in completing its opening. The lateral spacing of fingers 128 and 130 is substantially the width of the tube end, like finger 128, finger 130 is substantially the height of the tube, so that the two together form a tube shaping frame. Should a tube in flat condition fail to be properly transferred from the tube stack to the opening position, but instead be crushed or distorted, the tube opening devices just described will not advance but are latched in retracted position by a device which may be constructed as follows:

Projecting upwardly from the flat tube transferring slide 76 is a stud 761 adapted, near the end of the forward movement of the slide, to engage to a lever 762 pivoted at 763 and having a pin and slot connection 764 with a slide bar 765 and held in retracted position by a spring 766. Bar 765, which slides in a suitable guide fixed to the table, terminates in a hook 767 adapted to engage a shoulder 768 on the finger 130. Said finger and associated parts are thus latched in retracted position until the flat tube transferring slide 76 has substantially completed its normal movement, at which time finger 130 etc. are released by the engagement of stud 761 with lever 762. It should be noted that when movement of the transfer slide and the tube opening devices is thus obstructed, the springs comprising part of their connections to their driving devices are stressed in the manner heretofore described and thus the obstruction to movement is without injury to any part of the mechanism.

As the frame comprising fingers 128 and 130 completes its tube opening movement shoulders 132 thereon engage the end of the opened tube and in a subsequent additional movement of this mechanism effect the transfer of the opened tube onto a carrier chain to be presently described. Before this operation and during the tube opening movement of fingers 128 and 130 the opening of the tube is assisted by a device engaging the tube laterally. This device may be constructed as follows:

A cam 133 (Figs. 2A and 3) mounted on shaft 47 and having a longitudinal throw is engaged by a roller 134 on an arm 135 secured to a short shaft 136 supported in the table skirt 27. The roller is held in contact with the cam by a spring 137. An arm 138 secured to the inner end of shaft 136 is coupled to an arm 139 loose on said shaft by a spring 140. A link 141 connects arm 139 with an arm 142 depending from an arbor 143 supported in brackets 144 and 145 secured to the table 25. To the inner end of arbor 143 is secured an arm 147 terminating in a head 148 (Figs. 2B and 4), which head extends upwardly through the table 25 between the shoulders 90 which it will be recalled form an abutment against which the flat tube is placed on being transferred from the stack of tubes.

The timing of cams 110 and 133 is such that the head 148 moves forward against the side of the tube soon after the finger 128 enters the tube, thus the opening of the tube initiated by finger 128 is assisted by pressure of the head 148 against the side of the tube. The tube being thus fully shaped and ready for movement onto the carrier chain, the head 148 is retracted, and the pins 107 and 108 are lifted a distance sufficient to clear fingers 128 and 130 and the tube carried thereby. After the lifting of said pins 107 and 108, the tube carrying frame comprising fingers 128 and 130 executes the second portion of its advance movement to the position shown in broken lines in Fig. 5, placing the opened tube in one of the buckets of the carrier chain. Above the carrier chain at this point is a cover piece 149 provided with a spring pressed hook 150 which is engaged and deflected by the top of the advancing tube and near the end of the tube's advance movement drops behind the tube top and strips the tube from fingers 128 and 130 as these fingers are retired.

Carrier

The carrier comprises a pair of sprocket chains 151 and 152 (Figs. 4, 8, 12 and 13) passing over a pair of sprocket wheels 153 secured to a transversely extending shaft 155 and a second pair of sprocket wheels 156 fixed on a transversely extending shaft 158. To prevent sagging, the upper reach of the sprocket chains is preferably supported on rails 154 (Fig. 13) of a width to be received within the side flanges of the sprocket links. At regular intervals the outerside links of the sprocket chains are replaced by flanges 159 extending from carrier buckets identified generally by numeral 160. Said buckets comprise flat continuous bottom plates 161 (Fig. 2) and upstanding side plates 162 having outwardly beveled end portions 163; the right end bevels 163 facilitating the insertion of tubes into the buckets, as heretofore described, while the left end bevels are utilized in the insertion of trays into the tubes in a manner to be hereinafter described. The side walls 162 of the buckets comprise recesses 164 (Fig. 13) for a purpose which will hereinafter appear. By means of the carrier, the tubes and tube and tray assemblies are moved successively to positions for the performance of the several operations outlined at the beginning of this description. For this purpose, the carrier is intermittently advanced in steps of movement equal to the spacing of the buckets 160. Mechanism for this purpose may be constructed as follows:

Secured to the shaft 158 is a disk 165 (Figs. 2C, 8 and 14) provided with a spring housing 1650 containing a spring 1651 and a clutch ball 1652. Said clutch ball 1652 is urged by its spring into clutching engagement with clutch recesses 1653 in a ratchet wheel 166 actuated by a pawl 167 mounted at 1671 on an arm 168 of a member pivoted to shaft 158. The spacing of the clutch recesses 1653 corresponds to the spacing of the buckets 160. There is thus provided a slip connection which permits the ratchet wheel 166 to be moved by the operating mechanism about to be described when the movement of the carrier is obstructed and, after such slippage occurs, re-engages the carrier in proper relation with its own operating devices and other mechanisms with which it cooperates. The pawl is held in operative position by a suitable spring, as shown at 169. Integral with or rigidly connected to the arm 168 is a second arm 170 to which is joined at 171 a connecting piece 172, providing an adjustable connection with a link 173. The link 173 extends longitudinally, and at the rear of the machine is pivotally joined to a lever 174 (Fig. 3) having a fixed pivot at 175 in a housing 176. Lever 174 carries a cam following roller 177 which contacts the periphery of a cam 178 mounted on operating shaft 53, which shaft, it will be recalled, rotates in synchronism with shafts 47 and 32. Roller 177 is held in contact with its cam by means of a suitable spring 179.

*Tube and tray assembly*

The various operating stations along the carrier may be so located that there is one carrier bucket 160 in an idle position between successive operating stations. Thus, a tube having been inserted in one of the carrier buckets in the manner heretofore described, the first step of movement of the carrier moves this tube to a position in which no operation is performed. The next succeeding movement of the carrier brings the tube to a tray inserting station. The mechanism for inserting a tray at this point may be constructed as follows:

As heretofore described, trays of cartridges or other articles are received on the carrier belt 58 and are carried forward on this belt to position for being moved laterally from the belt and into a tube held in one of the tube-holding buckets 160. The means for stopping the trays at the point of insertion into the tubes may comprise a two-part arm 180 secured near the margin of table 25 and extending above the tray belt. Arm 180 comprises a tray-stopping portion 181 and a cut-out 182 the function of which will hereinafter appear. Arm 180 clears the tray belt by an amount sufficient to permit loose articles to pass thereunder. To a guide strip 183 extending along the right margin of the tray belt is secured an arm 184 extending diagonally from the end of the guide strip 183 and terminating adjacent the left edge of the carrier slightly forward from the front edge of the carrier bucket 160 which is in tray receiving position. The outer or left edge of the tray belt is guarded by a strip 185. The purpose of arm 184 and strips 183 and 185 is to direct to and retain on the tray belt for ejection from the machine over pulley 60 any articles which may be dislodged from a tray prior to or during the tray inserting operation. Loose articles are thus kept from engaging any moving parts.

Means are provided for properly seating the articles in a tray immediately prior to the insertion of the tray into the tube. These means may be constructed as follows:

Secured to the shaft 47 is a cam 191, (Fig. 2A) the periphery of which is followed by a cam roller 192 mounted on a lever 193 pivoted on an arbor 194. Roller 192 may be urged into engagement with cam 191 by suitable means such as a plunger 195 actuated by a spring 196 housed in a portion of the heretofore mentioned bracket 113. The elongated hub 197 of lever 193 is connected with an arm 198 projecting laterally and forwardly and terminating in a latterly extending presser 199 located immediately above the tray on the belt which is in position to be moved into the tube. A manipulating handle 200 projecting upwardly from the hub 197 enables the presser 199 to be lifted, and the entire assembly including cam follower 192 to be shifted rearwardly on the arbor 194 for the purpose of making desired adjustments or removing distorted trays from the carrier belt. The end of plunger 195 is rounded and engages a recess of corresponding shape in lever 193, and the plunger is retained in its housing to permit ready engagement and disengagement of the plunger and the lever.

The mechanism for removing loaded trays one at a time from the belt and thrusting them into the tubes may be constructed as follows:

Shaft 47 carries a cam 201 (Figs. 2A, 9 and 10) which is engaged by a roller 202 on a lever 203 having a fixed pivot at 204 in bracket 113. The upper end of lever 203 terminates in a shoe 205 which slidably receives a block 206 bored to rotatably receive a stud 207 projecting from a rectilinearly moving pilot bar 208. To the pilot bar 208 is secured a crosshead 209 and to the crosshead are secured a tray pusher bar 210 and a tray guide carrying bar 211. A spring 212 tensioned between the rear end of the pilot bar 208 and a fixed point on the supporting bracket 113 holds the cam roller 202 in engagement with the periphery of cam 201 and advances the assembly comprising pilot bar 208, pusher bar 210 and tray guide carrying bar 211, when the cam 201 rotates to bring its low part opposite the roller 202. Likewise secured to the crosshead 209 at 213 is a manipulative handle 214 which permits the manual retraction of the tray guiding and pushing assembly against the tension of spring 212 when desired.

The pilot bar 208, pusher bar 210 and tray guide carrying bar 211, are guided for rectilinear movement in supporting members secured to bracket 113 and identified as 215 and 216. Pilot bar 208 and pusher bar 210 are rigidly secured to crosshead 209, while tray guide carrying bar 211 has a frictional connection with said crosshead comprising a slot 217 in the bar which receives a stud 218 secured in the crosshead and carrying members 219 of a suitable friction material, such as fiber, which members receive the bar 211 between them. The lower friction member 219 is supported on an upwardly facing portion of the crosshead, and a spring 221 is interposed between the upper friction member 219 and a nut 222 on stud 218. An adjustable friction is thus provided. The mounting of bar 211 in the forward support 215 permits the bar a slight lateral movement for a purpose which will presently appear.

In front of support 215 the bar 211 terminates in a laterally extending head 223 which is apertured to rotatably receive a stud 224 projecting laterally from an arm 225, which arm extends forwardly above and beyond the tray carrying belt. To the forward end of arm 225 is secured a tray-guiding and bucket-aligning shoe (Fig. 17) identified generally by numeral 226. Said shoe comprises spaced downwardly and forwardly extending flanges 227 and 228 which define a tray guiding passage in alignment with the tray pusher bar 210 and the carrier bucket 160 which is in tray-receiving position. The portions of the inner (tray engaging) faces of flanges 227 and 228 adjacent the tray carrying belt are cut back to form a widened tray receiving mouth, and the lower rear corners of said flanges are notched to receive supporting ledges projecting respectively from the cut-out corner of arm 180 and a plate 244 to be presently described. At their forward ends the outer walls of flanges 227 and 228 are beveled inwardly as indicated at 229, the inclination of these surfaces substantially corresponding to the bevel 163 of the end portions of the sides 162 of the carrier buckets 160. The inner or tray guiding faces of flanges 227 and 228 are spaced apart the width of a tray, which distance is equal to or slightly less than the interior width of the tube held between the side walls 162 of the carrier bucket.

The normal position of crosshead 209 and associated parts is shown in Fig. 9. The end of tray pusher bar 210 stands slightly back of the left edge of belt 58 and the flanges 227 and 228 are clear of the carrier buckets 160. As the shaft 47 rotates to bring the lower parts of the cam 201 opposite roller 202, the crosshead advances and in its initial movement both the tray pusher bar 210 and the tray guide carrying bar 211 advance together. The tray on the belt in engagement with the stop arm 180 is picked up by the end of the pusher bar and moved transversely off the belt. The shoe 226 advances until the inwardly beveled ends of flanges 227 and 228 engage between the outwardly beveled ends of the sides of the carrier bucket 160 which is in tray-receiving position. The lateral movement of the bar 211 provided by its mounting in the support 215 enables an accurate alignment of the passage between flanges 227 and 228 with the bucket and compensates for inaccuracies in the positioning of the bucket. As soon as the ends of flanges 227 and 228 are snugly engaged with the sides of the bucket, shoe 226 and associated parts cease to move forward, the bar 211 slipping through its friction connection to crosshead 209. The pusher bar 210 continues to advance, thrusting the tray before it into the widened mouth between the rear ends of flanges 227 and 228 through the passage defined by these flanges and into the tube contained in the bucket 160 which is held in tray receiving position by said flanges. The final position of these parts is shown in Fig. 10. It should be noted that when the shoe 226 is in advanced or bucket engaging position flange 227 is still in engagement with the face of cut-out 182 in the arm 180. Should the tray become jammed after partial insertion into the tube the engagement of the shoe flanges with the bucket sides prevents the indexing movement of the carrier (the ball clutch 1652—1653 slipping in the manner heretofore described). The shoe 226 and the arm 180 are of sufficiently sturdy construction to cause the slipping of the clutch without injury.

*Shaped tube control*

Devices controlling the movement of the tube and particularly the forward end flap thereof from the time the tube leaves the shaping mechanism up to and during tray insertion will now be described. It will be recalled that tubes are delivered from the tube shaping device into the carrier buckets 160 with bodies shaped to tray receiving condition and with end flaps lying flat, and that they are stripped from the tube shaping device as said device is retracted by a spring pressed hook 150 (Fig. 5) supported in a carrier covering member or top rail 149. Said top rail 149 comprises a slotted horizontally extending web 231 (Figs. 2A, 5, 8, 9 and 12), upwardly extending flanges 232 and 233, and a hinge portion 234 by which it is pivoted to a member 235 secured to table 25. This mounting permits the top rail 149 to be swung up and back from its normal position to facilitate minor adjustments or the removal of tubes which may be jammed therein. The underside of top rail 149 contacts the tops of tubes in the carrier, and the top rail may be adjusted to accommodate tubes of different height by the insertion or removal of shims 2351 between the hinge member 235 and table 25. It is desirable to provide for a limited amount of variation in the end of the movement of the tube shaping and transferring device, and for this reason the hook 150 is so arranged that the tube caught thereby has not fully entered the carrier bucket 160. Its movement into the carrier bucket is completed by a cam surface 236 on the inner face of a side plate 237 depending from top rail 149. The side plate 237 extends forward to the end of top rail 149 and forms an abutment for holding the tube during tray insertion. On the opposite edge of top rail 149 is a second tube guiding side plate 238 (Fig. 2A) which terminates adjacent and in the rear of the tray inserting position. At the tray receiving position there is secured to top rail 149 an outwardly and upwardly inclined cam 239 by which articles in the tray are finally seated in position to clear the top of the tube just as they enter the tube. Aligned with side plate 238 and extending forwardly from the tray inserting position is a second short tube guiding side plate 240. Top rail 149 terminates in an undercut ledge 241 by which it is supported on other parts to be described. To insure lateral alignment, side plates 237 and 240 terminate in laterally inclined noses 242 received in correspondingly shaped recesses.

As a tube is advanced by the tube shaper into a bucket 160 and under the web 231 of top rail 149, its forward end flap passes beneath side plate 238 and is received in a recess 243 in a horizontally disposed plate 244 secured to table 25. The recess 243 is bounded by a cam surface 245. As a tube carrying bucket leaves the tube receiving station, cam 245 directs the forward or left end flap into a passage 246 defined by the underside of plate 244 and the upper surface of a cut out in table 25. Plate 244 comprises a forward extension 247 over which the trays pass in their movement into the tubes as heretofore described. The gap between the tube guiding side plates 238 and 240 is of sufficient width to provide clearance for the flanges 227 and 228 of the shoe 226 in their engagement with the beveled ends of the sides of the carrier buckets 160, as heretofore described. To the plate 240 is secured a depending flange 248, and on the opposite side of member 149 a flange 249 depends from said plate 237, said flanges acting to guide and hold the tube end flaps depressed as the tube and tray assembly passes to the next operation.

Means are provided for determining the presence of a tube in the bucket 160 in tray receiving position, and for preventing the operation of the tray inserting devices in the event that no tube is contained in the bucket in this position. These devices may be constructed as follows:

Pivoted on the pin of hinge 234 of the member 149 is a lever 250 having a horizontally extending surface 251 which projects through a slot in the web 231 of member 149 in position to rest upon the top of the tube in the bucket 160 in tray-receiving position. Lever 250 comprises a transverse aperture 252 which receives a pin 253 secured in the flanges 232 and 233. Aperture 252 is of sufficient width to permit the lever the movement necessary for the performance of its function, the purpose of the pin 253 being to hold the lever in place when the member 149 is lifted in the manner heretofore described. The free end 254 of lever 250 underlies an adjustment screw 255 held in a transversely extending lever 256, which lever comprises an offset portion pivotally joined at 258 to a lever 259 carried by a fixed pivot 260 projecting from the support 215. The connection 258 between lever 256 and lever 259 is in the rear of the pivot 260. In front of the pivot 260 the lever 259 comprises a portion 261 of reduced width and having an upwardly and rearwardly inclined surface upon which rides a stud 262 projecting from lever 256. The lever 259 comprises a rear end portion 263 of reduced width, which portion passes through vertically elongated slots 264 and 265 in crosshead 209 and supporting member 216. Above the slots 264 in crosshead 209 is a ledge 266 adapted to receive a nose 267 projecting from the shoulder at the forward end of the portion 263 of lever 259. Normally the rear end of lever 259 is in the depressed position shown in the drawings, and as the crosshead 209 advances the slot 264 therein traverses a part of lever 259. However, if there is no tube in the bucket 160 in tray receiving position the portion 251 of lever 250 is unsupported and said lever drops, removing the support of screw 255 and dropping the forward end of lever 256. By reason of the engagement of the stud 262 with the part 261 of lever 259 in front of its pivot, such movement of lever 256 raises the rear end of lever 259, bringing the nose 267 above the ledge 266. The initial advance movement of crosshead 209 engages said nose above said ledge, and further forward movement of the crosshead and associated parts, including operating arm 203, is thereby prevented. The rotation of shaft 147 carries cam 201 away from roller 202 on arm 203, but as the cam completes a full rotation it again engages roller 202, retracting crosshead 209 and disengaging ledge 266 from nose 267. If the indexing movement of the carrier taking place in the meantime has brought to tray receiving position a bucket containing a tube, the free end of lever 256 is supported, and the free end of lever 259 can drop to normal position, permitting normal movement of the tray inserting mechanism.

The pivotal connections between the tray guide carrying bar 211 and arm 225 and between lever 256 and lever 259 permit arm 225 and lever 256 to be swung upwardly and backwardly clear of the table; access is thus had to the tray belt. It is desirable at this time that the tray inserting mechanism be held in retracted position. Means are therefore provided for elevating the rear end of lever 259 to engage the nose 267 above ledge 266 when lever 256 is swung upward and backward. This device comprises a flat spring 268 (Fig. 10) secured to the underside of lever 259 and extending rearwardly and laterally beneath a cam associated with the pivot portion of lever 256. Movement of lever 256 about its pivot stresses said spring a sufficient amount to cause rotation of lever 259 about pivot 260 when this lever is free for such movement by the retraction of the crosshead 209 to clear the nose 267.

*Flap bending*

In the operation following the insertion of a tray into a tube in one of the buckets 160 in the manner above described the tips F of the end flaps, which in the finished package project inwardly beneath the tube top and above the tray, are sharply creased or bent off from the parts E of said flaps which form the ends of the package. Two indexing movements of the carrier convey the tube and tray assembly from tray inserting position to the flap bending position. The flap bending devices and their operation are as follows:

Secured to shaft 47 is a cam 269 (Figs. 2 and 11) controlling a cam follower 270 carried by a link 271, which link is guided on the shaft 47 by means of a block 272 rotatably mounted on said shaft and slidably held in an elongated aperture in a widened portion of the link 271. The end of link 271 is received in a sleeve 273 forming part of a link 274, links 274 and 271 being joined by a spring 275; thus, providing the usual connection adapted to yield if movement of the operated part is obstructed. The roller 270 is held in contact with the periphery of cam 269 by a suitable spring such as 276 which may conveniently be attached to a stud 277 by which said link 274 is pivotally connected to a flap bending arm 278 rotably held on an arbor 279. Secured to arm 278 is a pinion 280 meshing with an identical pinion 281 rotably held on an arbor 282 having fixed thereto a second flap bending arm 283. By reason of their connection through the meshing identical pinions 280 and 281 the arms 278 and 283 are advanced and operate simultaneously on the two end flaps. The upper end of each of the flap bending arms comprises a series of shoulders 284, 285 and 286, for the purpose of operating upon the end flaps of packages of different depths. The typical machine illustrated may by simple adjustments be made to handle tubes of any one of three different depths, and accordingly the arms 278 and 283 have been shown as each comprising three shoulders at different distances from their pivots, but it will be understood that the number of different depths of tubes that can be accommodated may be increased within reasonable limits. Cooperating with the shoulders 284, 285 and 286, are the depending ends 287 of a yoke 288 suitably supported above the carrier and the flap bending arms. Yokes of different widths are of course provided for cooperation with different pairs of shoulders 284, 285 and 286. The flap bending arms are longitudinally slotted to receive wire springs 289 and 290. When the arms are retracted (broken line position, Fig. 11) these springs project upwardly and outwardly in front of the arms, thus, as the arms are advanced the springs first engage the end flaps and cam them upward and inward. By this means flaps which are buckled downwardly are prevented from catching upon faces of the arms. As arms 278 and 283 approach the limit of their advancing movement the springs 289 and 290 are retired beneath the arm faces, and the junction line of parts E and F of the flaps are pressed into the angles at the bases of a pair of the shoulders 284, 285, 286, by the sharp exterior corners of yoke ends 287, bending off the parts F. Arms 278 and 283 are then retired to permit the indexing of the carrier.

The yoke 288 is detachably secured by suitable means, such as a screw 291 provided with a manipulative head, to a top rail 292 suitably supported from the table 25. The supporting means may comprise a bracket 293 secured to the table. To provide for tubes of different height, the top rail 292 may be raised or lowered on the bracket by the insertion or removal of suitable shims in the same manner in which the top rail 149 is raised and lowered as heretofore described. Top rail 292 is substantially a continuation of top rail 149, being rabbeted to support the projecting end 241 of top rail 149. The flap tip bending yoke above described and the end flap turning and guiding devices to be described are all removably held on top rail 292 to provide for ready detachment and replacement by other essentially similar devices for handling packages of varying height. For the lowest package the operation of bending off the end flap tips F as above described takes place substantially in the plane of the bottom of the package. For packages of greater depth the portion E of the end flaps are longer and are engaged by shoulders of arms 278 and 283 which are further from their pivots; hence, the bending off of the flap tips F occurs somewhat above the plane of the bottom of the package. Fig. 11 shows a yoke for the highest of the three packages for which arms 278 and 283 are designed. For all heights of packages, however, the portions E of the end flaps are subsequently guided into a substantially horizontal position approximately in the plane of the package bottom.

*End flap turning and package closing*

In the indexing movement of the carrier which advances the packages from the flap tip bending station, the end flap tips F ride up rearwardly inclined faces of horizontally disposed shoes 294 (Fig. 22) secured to exterior flap turning guides 295 fixed to a yoke member 296 detachably secured to top rail 292 by means such as a screw 297 provided with a manipulative head. The flanges of yoke 296 extend vertically downwardly along the sides of top rail 292, the inner faces 2961 of such vertically extending portions engaging the upper portions of the ends of the package. Below the faces 2961 the flanges are inclined outwardly to form inner flap guides 298 (Figs. 3 and 4) terminating a short distance above the upper faces of shoes 294. The rearwardly facing corners of flanges 298 are cut back, as shown at 299, to direct the portions E of the end flaps into the horizontal groove between shoes 294 and the margin of flanges 298. For packages of greater depth, a longer and higher cut-back 299 is provided. Near the forward ends the lower margins of flanges 298 are cut away, the forward portions of shoes 294 slope upwardly, and the interior surfaces of guides 295 are curved, all to properly direct end flaps into the flap holding yoke at the flap inserting station. The position of the package and the end flaps shortly before they emerge from the flap tip turning assembly is shown in broken lines in Fig. 23.

Adjacent the yoke 296 and at the package closing station there is removably secured to the top rail 292 by suitable means, such as a screw 301 provided with a manipulative head, a flap guiding yoke 302 (Figs. 4, 8, 12 and 13). The depending flanges 303 of yoke 302 are preferably forked to receive the forked ends of package closing fingers to be described and comprise upwardly and inwardly curving faces 304 terminating in a plane which is below the underside of top rail 292 by a distance substantially equal to the thickness of the top of the tube. The margins of flanges 303 adjacent the flap tip turning assembly are cut back as shown at 305 to provide smooth guide surfaces for flaps leaving the turning assembly and passing into the inserting yoke. Studs 306 projecting inwardly from the forks of flanges 303 adjacent the flap tip turning assembly act to prevent downward movement of the end flaps, serving substantially as continuations of the shoes 294. A fragment of the tube and tray assembly in position for closing the package by inserting the flap tips F beneath the top of the tube and above the tray in the tube is shown in Fig. 24.

Three different mechanisms operate on the package at the package closing station. First, the package is lifted into firm engagement with the underside of the top rail 292 by a plunger applied beneath the floor of the carrier bucket 160. This is done to insure that the top of the tube will be properly aligned with the arcuate guide faces of the flanges 303, it being remembered that the flap tips are of comparatively thin stock and the package must be accurately held in order to insure their insertion into the narrow space between the top of the tray and the top of the tube. Second, pressure is applied to the ends of the top of the tube for the purpose of finally seating articles in the end of the tube and to provide clearance for the inserting of the tips F of the end flaps. Third, the end flaps are turned upwardly and inwardly, inserting the tips F and completing the package. The mechanism for seating articles in the ends of the tray will first be described:

The under portion of top rail 292 is suitably recessed to receive a pressure member 310 (Figs. 4, 8, 12 and 23) pivoted to the top rail at 311. Said presser member is in the form of a letter H, the cross bar of the H carrying a stud 312 projecting upwardly through an aperture in the top rail 292. The upper end of stud 312 carries a spring 313 compressed between the upper surface of top rail 292 or a washer bearing thereon and an adjusting nut 314 carried on the threaded upper end of stud 312. The free ends of the H-shaped presser 310 extend over the package at the package closing station and are adapted to be depressed by pressure upon the top of stud 312 against the compression of spring 313. To thus actuate the presser at the proper time the following means are provided:

Main shaft 47 carries a cam 315 (Fig. 2) controlling a cam following roller 316 mounted on an arm 317. Roller 316 is held in contact with the periphery of cam 315 by suitable means such as a spring 318 tensioned between the arm 217 and a bracket secured to the table 25. Arm 317 is fixed to a short arbor 320 having secured thereto a horizontally extending arm 321 (Figs. 2, 8, 12 and 23) which carries in its free end an adjustable screw 322 positioned above and adapted to engage and depress the stud 312 and presser 310 when roller 316 engages the low part of cam 315. It will be understood that this operation takes place prior to the actuation of the flap inserting fingers, to be described. In their retracted position, the package engaging ends of presser 310 are slightly above the plane of the underside of top rail 292 which extends above them. Thus, at the time the flaps are inserted the mid-portion of the top of the tube is firmly held while the outside of the end portions is free; the end portions tend to bulge upwardly due to the pressure on the mid-portion. The mechanism for pressing the package upwardly so that its mid-portion is gripped by the reach of the top rail extending between the package engaging ends of presser 310 may be constructed as follows:

Secured to drive shaft 47 is a cam 323 (Figs. 2 and 13), the periphery of which is followed by a roller 324 mounted on a lever 325 pivoted at 326. Roller 324 is held in contact with the periphery of cam 323 by a suitable spring, such as 327. To the inner end of lever 325 is secured a vertically disposed plunger 330 comprising a head 331 adapted to engage the underside of the carrier bucket 160 which is in package closing position. The construction of cam 323 is such that the plunger is actuated to hold the carrier bucket and the package thereon in elevated position with the top of the package in contact with the underside of top rail 292 throughout the other operations performed at the package closing station.

The articles in the ends of the tray being seated and the package firmly held against the top rail and in proper relation to the flap guiding yoke, the end flaps are engaged by upwardly and inwardly swinging fingers acting to insert the tips F beneath the tube top and complete the package. The end flap inserting mechanism may be constructed as follows:

Secured to the drive shaft 47 is a cam 333 (Figs. 2, 8, 12 and 13) which controls a cam following roller 334 carried by a link 335 having a widened head which is slotted to slidably receive a guide block 336 rotatably held on shaft 47. The inner end of link 335 is received in a sleeve 337 forming part of a link 338, links 335 and 338 being joined by a tension spring 339 which normally transmits motion without distortion but may elongate if the motion of parts associated with link 338 is obstructed. A spring 340 serves to hold roller 334 in contact with the periphery of cam 333. The inner end of link 338 is pivotally joined to a depending portion 341 of a flap inserting fork 342 pivoted on arbor 279. Secured to the hub of fork 342 is a pinion 343 meshing with a similar pinion 344 pivoted on arbor 282 and rigidly connected to flap inserting fork 345. This connection enables fingers 342 and 345 to move together and operate on opposite ends of the package at the same time. The prongs of forks 342 and 345 are interspersed with the forked ends of the flap holding yoke flanges 330.

The retracted position of forks 342 and 345 is shown in Fig. 13. As cam roller 334 is drawn to the left by engagement with the high portion of cam 333, these forks are advanced, their end faces engaging the portions E of the end flaps and pressing them inwardly, the tips F of the flaps being directed into the top of the tube above the trap by the yoke fingers 303. Forks 342 and 345 are then retracted, and the package is complete and ready for delivery.

*Removing packages from carrier*

Two indexing movements of the carrier from the package closing position brings the completed package to a station at which the package is removed from the carrier and placed in a device adapted to invert the package to enable printing thereon of certain identifying data. To facilitate the subsequent assembly of packages for placing them in outside containers, it is desirable that the packages after inversion be arranged in staggered relation, adjacent packages being out of line with each other. This is accomplished by the mechanism which removes packages from the carrier and places them in the inverter, which mechanism may be constructed as follows:

Secured to drive shaft 47 is a pinion 350 (Fig. 14) meshing with a gear 351 mounted on a stub shaft 352 supported in a frame 353 (Fig. 2) secured to the table. Secured to or integral with gear 351 is a double-throw box cam 354, the groove of said box cam receiving a roller 355 on a link 356 comprising a widened end which is slotted to slidably receive a guide block 357 rotatably held on stub shaft 352. The inner or free end of link 356 is bored to receive a spring 358 and a spring follower 359 provided with a lateral stud 360 projecting through a slot in the tubular portion of link 356. The projecting end of stud 360 is received in an aperture in a package transferring arm 361 pivoted at 362 to the frame 353 and provided with a package engaging foot 363. Due to the double throw of cam 354, alternate movements of package transferring arm 361 are of the same length, while succeeding movements are of different length. This arm is so arranged with respect to the carrier that its forward movement engages the end of a package in the carrier bucket 160 in the package delivery position and thrusts this package endwise out of the carrier bucket and into the package inverter block 364, the final position of the package in the inverter block being determined by the throw of arm 361, successive packages occupying different positions in the inverter block.

*Package inverter*

Inverter block 364 (Figs. 2, 2C, 14 and 16), which comprises a back 365 and a base 366 on which the package rests, is carried on an arm 367 secured by means of a hub 368 to a sleeve 369 journalled in a long bearing block secured to the table. The arm is designed to execute a one-half revolution, delivering the package in the inverter block onto a feed belt, to be described, and to be restored to its package-receiving position. For this purpose, the sleeve 368 is given a one-half revolution first forward and then backward by means which may be constructed as follows:

Pinion teeth (Fig. 8) formed on the sleeve 369 mesh with the teeth of a vertically disposed rack 372 held in mesh with the pinion by suitable devices associated with the sleeve support. Near the lower end of rack 372 its teeth engage the teeth of a gear 373 rotatably held on a fixed arbor 374. On a stud 375 projecting laterally from gear 373 is rotatably held a short link 376 having an adjustable connection with a link 378 extending longitudinally of the machine and joined to an arm 380 depending from an arbor 3801 journalled in bearings secured to table 25. Rigid with arm 380 is an arm 3802 (Fig. 3) to which is joined another longitudinally extending link 379. The end of link 379 is received in a sleeve 381 forming part of a link 382, links 379 and 382 being joined by a spring 383 tensioned between a stud 384 on sleeve 381 and a stud 385 projecting laterally from link 379 through a slot 386 in sleeve 381. The opposite end of link 382 is rotatably held on a stud 387 projecting from a lever 388 supported on a fixed pivot 389 and carrying a roller 390 which contacts the periphery of a cam 391 secured to the drive shaft 53 which it will be recalled extends transversely near the rear of the machine and is geared to the main drive shaft 47. Roller 390 is held in contact with the periphery of cam 391 by a suitable spring such as 392 tensioned between an extension of lever 388 and a support 393 depending from the table. When the roller 390 moves from the low part to the high part of cam 391, links 382, 379 and 378, which in effect are one continuous link, are pulled, rotating gear 373, lifting rack 372, rotating sleeve 369 and the inverted block from package receiving position through an arc of substantially 180° to package-delivering position. Since the package inverter rotates on a horizontal axis through an arc of 180° from package receiving position, it is necessary to provide means for gripping or holding a package in the inverter during its movement and for releasing the package for delivery at the proper time. The gripper device and its operating means may be constructed as follows, reference being made to Figs. 2, 15 and 16:

The inverter block has been described as comprising a base 366 on which the package rests and a back 365 which is contacted by the side of the package toward the rear of the machine. The front of the package is engaged by a gripper plate 395 arranged to slide on the base 366 and pressed into package gripping position by a spring 396 occupying a recess in the inverter arm 367 and engaging a plunger 397 secured to the gripper plate 395. To the gripper plate 395 is secured an arm 398 comprising a vertically extending portion by which it is secured to the gripper plate and a horizontally extending portion by which it is joined to an arm 399 which is offset to clear the hub 368 and terminates in a downwardly extending portion 400 comprising a threaded aperture receiving an adjustable pin 401. Pin 401 passes through aligned apertures in hub 368 and sleeve 369 into the path of movement of the conical end 402 (Fig. 15) of a thrust rod 403 held for longitudinal movement within the sleeve 369. When thrust rod 403 is advanced, the pin 401 is cammed back by engagement with the conical end 402 of said thrust rod, retracting the gripper and releasing the package contained therein. Thrust rod 403 extends to the right side of the machine where it is provided with a head 404 having a recess 405 adapted to receive studs 406 and 407 projecting inwardly from the forked upper end of a lever 408 having a fixed pivot at 409 and coupled at its lower end to a sleeve member 410 adjustably connected to a transversely extending link 411. At its left end link 411 is adjustably connected to a sleeve member 412 (Fig. 14) joined at 413 to the depending arm of an elbow lever 414 having a fixed pivot at 415 and carrying a roller 416 which follows the periphery of a cam 417 fixed to the main drive shaft 47. Roller 416 is held in contact with the periphery of cam 417 by suitable means such as spring 418 tensioned between the horizontally extending arm of lever 414 and a fixed part of the machine. The cam 417 is so arranged as to retract the thrust rod 403 and permit gripper plate 395 to be advanced by spring 396 soon after a package is placed in the inverter block by the package transferring arm 361, and to leave the gripper thus until the inverter block has executed its movement to package delivering position, at which time the thrust rod 403 is advanced to retract the gripper and release the package.

Stop mechanism

Means are provided for automatically stopping the machine in the event of any one of a number of malfunctions or adjustments and for automatically restarting the machine when the maladjustment has been corrected either manually or automatically. The malfunctions which thus stop the machine are as follows:

First: Failure of the tube opening and opened tube transfer mechanism to complete its movement to retracted or home position.

Second: Failure of the tray pusher bar to complete its forward movement and fully insert the tray advanced thereby into the tube. Associated with this device is mechanism already described by which the absence of a tube at the tray receiving position prevents any forward movement of the tray pusher bar.

Third: Absence of a tray in position to be inserted into the tube.

Fourth: Failure of the package delivering device to remove a package from the carrier. The presence of a package in the carrier bucket that has passed the package delivering arm actuates the stop.

Fifth: Failure of the package inverter to complete either its advance package delivering movement or its return to package receiving position. The general operation of the stop mechanism is as follows:

The shaft 47 is driven through a clutch held in closed position by a spring and controlled by a plunger which must be retracted twice in each revolution of the shaft 47 to permit the clutch to remain closed. The plunger is controlled by a bar which is reciprocated twice in each revolution of the shaft 47 by a cam on the shaft 32. To retract the clutch disengaging plunger said bar must execute its full reciprocatory movement. In the event of any of the malfunctions above set forth, movement of the bar is blocked and its failure to perform its movement results in the opening of the clutch. The specific embodiment of these devices illustrated in the drawings may be described as follows, reference being made to Figs. 2, 12 and 14:

As heretofore described, shaft 32, which is rotated by the motor, has fixed thereto a bevel pinion 45 meshing with a bevel pinion 46 rotatably mounted on shaft 47. The hub of pinion 46 is provided with recesses 425 for engagement by teeth 426 on the clutch member 56 which is splined to shaft 47. The hub of clutch member 56 is provided with two semi-circumferential cam tracks 427 which are widened through the greater part of their length but comprise active surfaces 428 and terminate in narrow portions 429. A plunger 430 slidably held in a fixed frame is adapted to enter either of the cam tracks 427, the particular track depending upon the position of the clutch member. When the plunger 430 is advanced into one of the tracks 427 the clutch member 56 remains in closed position until its rotation brings the active surface 428 into contact with the plunger and thus draws the clutch member to the left against the compression of spring 57, disengaging the teeth 426 from notches 425 and opening the clutch. When plunger 430 is subsequently retracted, spring 57 will advance the clutch member and the clutch is closed as the rotation of pinion 46 brings notches 425 opposite teeth 426. Joined to the inner end of plunger 430 is an arm 431 secured to an upright post 432 rotatably held in a fixed frame. To the upper end of post 432 is secured an arm 433 which is contacted by a roller 434 on a crosshead 435 secured to the upper end of a lever 436 pivoted at 437 and carrying, at an intermediate point, a roller 438 which engages the periphery of a cam 439 secured to shaft 32. Cam 439 is provided with two oppositely disposed active surfaces corresponding to the two cam tracks 427 on the hub of clutch 56. When roller 438 engages a low part of the cam between these two active surfaces roller 434 engages arm 433, swinging this arm forward and retracting plunger 430 so that the machine continues to operate, but when, twice in each revolution of the shaft 32, roller 434 engages a high part of cam 439, plunger 430 is advanced into one of the tracks 427. Should the roller 438 fail to follow the surface of cam 439 the plunger 430 will not be retracted and when it encounters the active surface 428 the clutch will be opened. The stop devices heretofore outlined are connected in such a way as to prevent the forward movement of the crosshead 435 on lever 436. Said crosshead is provided with a laterally facing shoe 440 which rotatably and slidably receives a stud 441 projecting from a longitudinally extending stop bar 442 urged forward by suitable means such as a spring 443 compressed between a collar 444 secured to the stop bar 442 and a fixed abutment which may conveniently be a block 445 in which stop bar 442 is slidably mounted. It will be apparent that forward movement of the stop bar 442 after its rearward movement by the engagement of roller 438 with the active surface of cam 439 is essential to the retraction of plunger 430 and the continued operation of the machine. The several stop devices operate to prevent such forward movement.

The stop device associated with the tube opener and opened tube delivery mechanism may comprise a head 446 (Fig. 9) on the tube opener operating link 114, which head is apertured to slidably receive a rod 447 provided near its inner end with a nut 448 or other suitable device adapted to be engaged by the surface of head 446 as the link approaches its leftward or fully advanced position. The outer end of the rod 447 is joined to the lower end of a lever 449 having a fixed pivot at 450 and joined at its upper end to a link 451 (Fig. 2) mounted for longitudinal sliding movement. The inner end of link 451 comprises an undercut notch 452 cooperating with a similar undercut notch 453 near the rearward end of stop bar 442. A suitable spring such as 454 tends to move the link 451 inwardly until its free end enters a cut-out in the stop bar 442 forward from the undercut notch 453, aligning notches 452 and 453 for engagement. The link 451 tends to be thus moved by spring 454 at all times except when the tube delivery mechanism is in its most advanced position and has moved the tube being delivered into the carrier a sufficient distance to permit the engagement of the tube by the stripping hook 150. This position of the tube delivery device coincides with one of the two forward movements of stop bar 442. It will be remembered that the stop bar 442 has two such forward movements in each complete cycle of operation. Means are therefore provided for retracting the link 451 from the cut-out in stop bar 442 to permit the second forward movement of said stop bar. These means may comprise a cam 4491 fixed to main shaft 47 and operating upon a cam following roller 4492 on lever 449 to actuate said lever and retract the link 451 at the proper time.

The means for stopping the machine in the absence of a tray in position for insertion into the tube or in the event of failure of the tube inserting mechanism to complete its forward movement may include a three-armed lever pivoted to the table 25 at 456 and comprising a rearwardly extending arm 457, an inwardly extending arm 458, and a forwardly extending arm 459. Near its free end, arm 459 carries an inwardly extending link 460 terminating in an undercut notch 461 cooperating with an undercut notch 462 in stop bar 442 in the same manner in which the undercut notches 452 and 453 cooperate. Arm 457 of the three-armed lever is adapted to be engaged by a block 463 mounted on the tray pusher bar 210 and so positioned thereon as to engage arm 457 near the completion of the forward movement of the pusher bar. When this engagement occurs link 460 is retracted, enabling stop bar 442 to perform its complete forward movement. Arm 458 of the three-armed lever terminates in a rearwardly facing head 464 (Figs. 2 and 9) positioned just above the tray belt and projecting through a notch in the tray stopping member 182 heretofore described. In its advanced position head 464 stands slightly in the rear of the tray engaging face of said tray stopping member. Thus as the tray on the belt approaches the stopping member it first engages and actuates the three-armed lever, retracting link 460. It will be apparent that the machine is thus stopped in the event that there is no tray in a position for insertion into the tube or in the event that the tray fails to fully enter the tube, thus preventing complete movement of the tray pusher bar. A spring such as 465 draws the link 460 forward toward the stop bar 442.

The means for stopping the machine in the event that a package remains in the carrier and is moved beyond package delivering position may comprise a feeler finger 466 (Figs. 2, 12 and 14) secured to an arbor 467 and overlying the carrier bucket 160 which has advanced from package delivering position and is being carried down around the carrier chain sprocket wheel. This finger is received in the cutouts in the sides of the carrier buckets heretofore described as each bucket in turn passes under the finger and if any bucket contains a package the finger will be lifted, rotating the arbor 467. To the arbor 467 is secured an arcuate plate 468 carrying a stud 469 supporting one end of a spring 470, the opposite end of which is attached to a fixed stud 471. The spring 470 thus tends to hold feeler finger 466 depressed. Movement of the plate and the arbor by the spring 470 is limited by the engagement of a stud 472 projecting from the left side of the plate with a part of the package delivering mechanism supporting frame 353. Secured to the arbor 467 adjacent the plate 468 is an arm 473 comprising an L-shaped slot 474 which receives a stud 475 projecting laterally from the stop bar 442. As long as feeler finger 466 remains in depressed position, stud 475 in the movement of stop bar 442 reciprocates in the longitudinally extending leg of the L-slot 474. Should a package be carried past delivered position and lift the feeler 466, the arbor 467 and arm 473 are rotated, lifting arm 473 to a position in which the stud 475 will be engaged in the vertically extending leg of the L-slot, thereby preventing the forward movement of the stop bar and stopping the machine.

Figure 2:
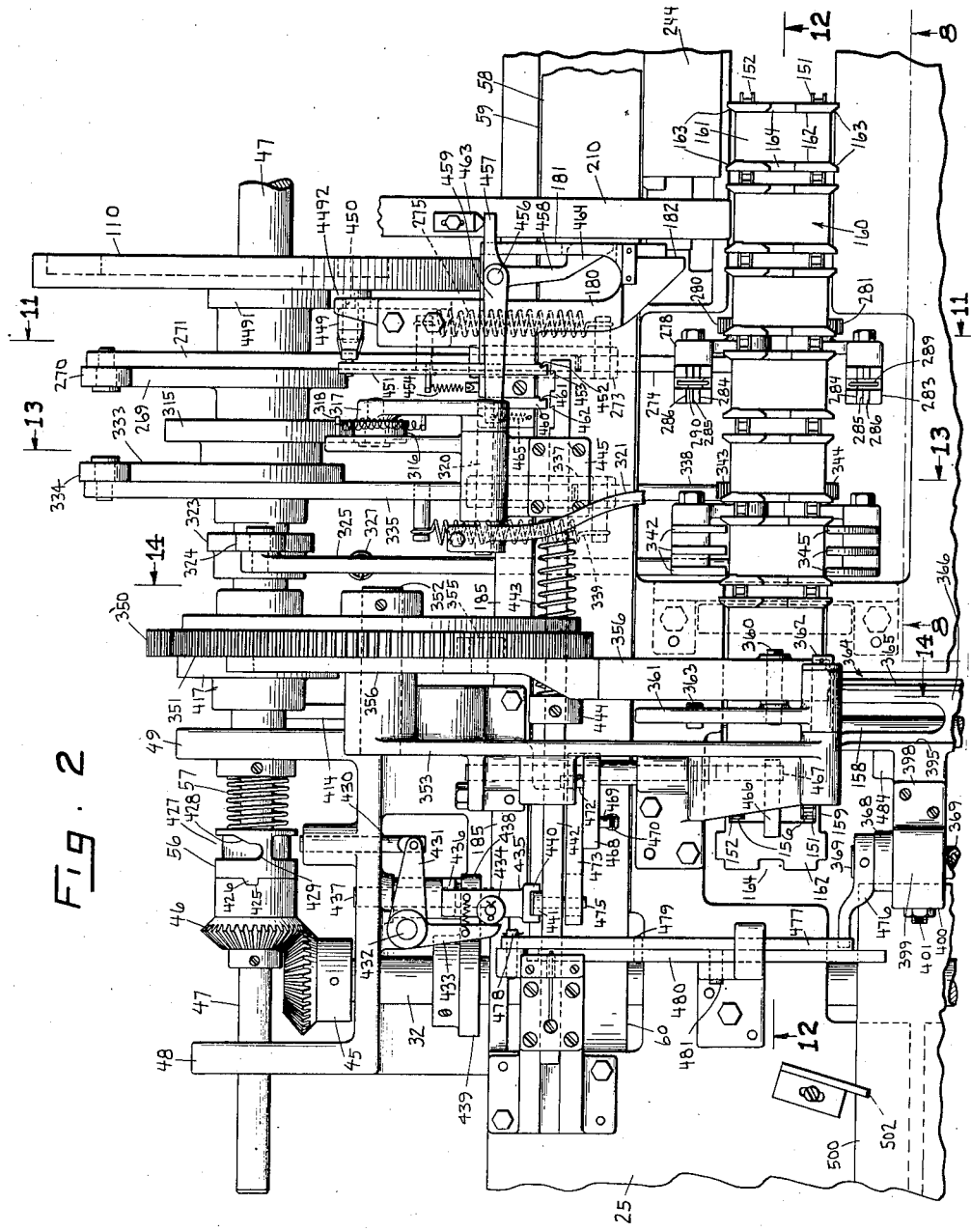
Fig. 2D is a plan of the printer, the printer belt being common to Figs. 2, 2C and 2D.

The stop mechanism associated with the package inverter may be constructed as follows:

Secured to the end of the package inverter carrying sleeve 369 is an arm 476 (Figs. 2, 2C and 15). When the inverter is in package receiving position the free end of arm 476 underlies and elevates the right end of a scissors lever 477 mounted on a fixed pivot 478 and connected by pin 479 with a second scissors lever 480 carried on a fixed pivot 481. Connecting pin 479 is between the pivots 478 and 481, hence the lifting of the free end of scissors lever 477 will lift the free or leftward end of scissors lever 480. Said end of lever 480 overlies the stop bar 442 and is provided with an undercut notch 482 cooperating with an undercut notch 483 in said stop bar. The right end of scissors lever 480 is adapted for engagement by a ledge 484 located on the inverter arm adjacent the package receiving block, such engagement occurring when the inverter reaches the position in which it delivers a package to the printer belt. It is thus apparent that with the inverter either in its normal package receiving position or at the end of its package inverting and delivering movement the left end of scissors lever 480 is elevated out of the path of movement of the stop bar 442, but during the movement of the inverter said left end of lever 480 will drop into the cutout in stop bar 442, placing the undercut notches 482 and 483 in position for engagement to prevent the completion of the leftward movement of the stop bar unless the inverter completes its movement and again lifts the left end of lever 480 before such engagement occurs.

The position in which stop bar 442 is held by engagement of any of the pairs of undercut notches heretofore described is such that when roller 438 engages the active surface of cam 439 the stop bar will be moved rearwardly an amount sufficient to disengage the notches and permit the retraction of the movement blocking part in the event that the obstruction or malfunction, which caused the engagement of said pair of notches and the consequent stopping of the machine, has in the meantime been removed. For example, the machine may be stopped for lack of a tray in position for insertion in a tube. If during the succeeding half-revolution of shaft 32 a tray is carried by the belt into proper position it tends to displace latch bar 460, and will do so when the stop bar 442 is moved to the rear disengaging undercut notches 461 and 462. Stop bar 442 can then execute the full forward movement necessary for closing the clutch and resuming operation.

*Conveying packages to the printer*

Packages are delivered by the inverter mechanism heretofore described onto a conveyer belt 500 (Figs. 2D 8, 14 and 15) which passes over a pulley 501 on the shaft 32. Mention has already been made of the fact that the packages are delivered in staggered relation; one package, for example, being delivered toward the left edge of the conveyer belt 500, and the next package being delivered toward the right edge of said conveyer belt. The purpose of this arrangement is to provide that as the packages leave the printer and are ready to be packaged in outside cartons adjacent packages shall be reversely faced so that a stack can be readily made in which the exposed edges G (Fig. 19) of the tube stock will face inwardly, leaving a smooth exterior surface over which the carton may be slipped without catching on said stock joint. The packages are delivered onto the belt 500 in position transverse to the belt. The means for turning them longitudinally of the belt may comprise arms 502 and 503 mounted on the table adjacent the belt and projecting over its right and left portions respectively. The engagement of a package with either arm turns the package into a longitudinal position, adjacent packages engaging arms at opposite sides of the belt being thereby reversely turned. Adjacent the printer and above the belt are placed guide pieces 504 and 505 by which the packages are turned and guided as they move in sequence into engagement with a stop and clutch controlling arm 506. From this position they are shifted laterally off the belt 500 by arms 508 projecting from a chain 509 and moving in synchronism with the print roll, and move to a printer comprising an inking roll 507. The printing mechanism per se is not claimed in this application and will not be described in detail.

It will be apparent that the complete machine comprises many parts and performs many functions, any of which might be performed separately or in conjunction with mechanisms differing from those herein described, and that throughout the description and drawings are directed to representative embodiments of inventions susceptible to many modifications, all falling within the scope of the appended claims, which claims are to be broadly construed.

What is claimed is:

1. In a machine of the character described, means for delivering collapsed tubes comprising end closing flaps one at a time to a tube opening station, means for holding a tube during opening comprising a pair of fingers adapted to be pressed upon the upper surfaces of said end flaps and a supplemental pair of fingers adapted to engage the rearward edges of said end flaps, and devices acting to open the tube while it is so held.

2. In a machine of the character described, means for delivering collapsed tubes comprising end closing flaps one at a time to a tube opening station, means for holding a tube during opening comprising a pair of fingers adapted to be pressed upon the upper surfaces of said end flaps and a supplemental pair of fingers adapted to engage the rearward edges of said end flaps, and devices acting to open the tube while it is so held, said devices comprising a rectilinearly moving finger adapted to pass over one of said end flaps and enter said collapsed tube.

3. In a machine of the character described, means for delivering collapsed tubes comprising end closing flaps one at a time to a tube opening station, means for holding a tube during opening comprising a pair of fingers adapted to be pressed upon the upper surfaces of said end flaps and a supplemental pair of fingers adapted to engage the rearward edges of said end flaps, and devices acting to open the tube while it is so held, said devices comprising a rectilinearly moving finger adapted to pass over one of said end flaps and enter said collapsed tube and an auxiliary arm adapted to engage and lift the forward edge of said collapsed tube.

4. In a machine of the character described, means for delivering collapsed tubes comprising end closing flaps one at a time to a tube opening station, means for holding a tube during opening comprising a pair of fingers adapted to be pressed upon the upper surfaces of said end flaps and a supplemental pair of fingers adapted to engage the rearward edges of said end flaps, and devices acting to open the tube while it is so held, said devices comprising a rectilinearly moving finger adapted to pass over one of said end flaps and enter said collapsed tube, said finger forming part of an arm of a width conforming to an interior dimension of an opened tube.

5. In a machine of the character described, means for delivering collapsed tubes comprising end closing flaps one at a time to a tube opening station, means for holding a tube during opening comprising a pair of fingers adapted to be pressed upon the upper surfaces of said end flaps and a supplemental pair of fingers adapted to engage the rearward edges of said end flaps, and devices acting to open the tube while it is so held, said devices comprising a rectilinearly moving finger adapted to pass over one of said end flaps and enter said collapsed tube, said finger forming part of an arm of a width conforming to an interior dimension of an opened tube, said finger and arm forming part of a frame having the shape of an opened tube insertible into for shaping said tube as it is opened.

6. In a machine of the character described, means for delivering collapsed tubes one at a time to a tube opening station, means for securing said tubes in position to be opened comprising a pair of spaced fixed abutments engaging the forward edge of said tube and a pair of fingers adapted to be moved into engagement with the rearward edge of said tube, and tube opening devices comprising a rectilinearly moving frame having a forwardly extending finger adapted to be inserted in said collapsed tube to initiate its opening and a shorter finger adapted to enter the tube after its opening has been thus initiated, said fingers being connected with arms on said frame so spaced, positioned and proportioned as to conform to and define the interior shape of an opened tube.

7. In a machine of the character described, means for delivering collapsed tubes one at a time to a tube opening station, means for securing said tubes in position to be opened comprising a pair of spaced fixed abutments engaging the forward edge of said tube and a pair of fingers adapted to be moved into engagement with the rearward edge of said tube, tube opening devices comprising a rectilinearly moving frame having a forwardly extending finger adapted to be inserted in said collapsed tube to initiate its opening and a shorter finger adapted to enter the tube after its opening has been thus initiated, said fingers being connected with arms on said frame so spaced, positioned and proportioned as to conform to and define the interior shape of an opened tube, and a supplemental opening device comprising an arm oscillating between said fixed abutments and adapted to engage and displace the forward edge of said tube.

8. In a machine of the character described, means for delivering collapsed tubes one at a time to a tube opening station, means for securing said tubes in position to be opened comprising a pair of spaced fixed abutments engaging the forward edge of said tube and a pair of fingers adapted to be moved into engagement with the rearward edge of said tube, tube opening devices comprising a rectilinearly moving frame having a forwardly extending finger adapted to be inserted in said collapsed tube to initiate its opening and a shorter finger adapted to enter the tube after its opening has been thus initiated, said fingers being connected with arms on said frame so spaced, positioned and proportioned as to conform to and define the interior shape of an opened tube, and means for advancing said frame to thus open and shape said tube.

9. In a machine of the character described, means for delivering a collapsed tube comprising end closing flaps to a tube opening station, means for holding said collapsed tube in position to be opened comprising a pair of spaced abutments adapted to engage the forward edges of said end flaps, a pair of fingers adapted to engage the rearward edges of said end flaps and associated therewith a pair of fingers adapted to be pressed into engagement with the upper surfaces of said end flaps, and means for advancing said fingers to effective position after a tube has been delivered to the tube opening station.

10. In a machine of the character described, means for delivering collapsed tubes comprising end closing flaps one at a time to a tube opening station, and means for holding said collapsed tube at said station comprising a pair of fingers adapted to be moved into engagement with the rearward edge of the tube and a second pair of fingers associated with said first pair of fingers and adapted to be moved into engagement with the upper surface of a portion of the tube not displaced during the opening operation.

11. In a machine of the character described, means for delivering collapsed tubes comprising end closing flaps one at a time to a tube opening station, means for holding said tube at said station comprising a finger adapted to be moved into engagement with the rearward edge of the tube and a second finger adapted to grip said tube, tube opening mechanism comprising a tube shaping frame provided with an extending finger adapted to ride over one of said end flaps and enter the collapsed tube to initiate its opening, means for advancing said frame to open and enter said tube while said tube is held by said fingers, means for thereafter stopping the advance movement of said frame and retracting said fingers, and means for further advancing said frame after the retraction of said fingers to deliver the tube thereon to a carrier.

12. In a machine of the character described, means for delivering collapsed tubes comprising end closing flaps one at a time to a tube opening station, means for holding said tube at said station comprising a finger adapted to be moved into engagement with the rearward edge of the tube and a second finger adapted to grip said tube, tube opening mechanism comprising a tube shaping frame provided with an extending finger adapted to ride over one of said end flaps and enter the collapsed tube to initiate its opening and a shoulder limiting the movement of said frame into said tube, means for advancing said frame to open and enter said tube while said tube is held by said fingers, means for thereafter stopping the advance movement of said frame and retracting said fingers, means for further advancing said frame after the retraction of said fingers to deliver the tube thereon to a carrier, means associated with said carrier for stripping the tube delivered thereon from said frame, and means for retracting said frame to its initial position.

13. In a machine of the character described, mechanism for the opening of collapsed tubes provided with end closing flaps including a frame comprising side plates spaced and dimensioned to conform to the interior of an open tube, one of said side plates being provided with an elongated and pointed finger adapted to pass over the adjacent end flap and enter the collapsed tube to initiate its opening and the second side plate terminating forwardly in a shorter finger adapted to enter the partly open tube and assist in completing its opening, the upper surfaces of each of said fingers being inclined upwardly and merging with the upper surfaces of said side plates.

14. In a machine of the character described, means for opening collapsed tubes including a tube opening and shaping frame comprising side plates spaced and proportioned to conform to the interior of an open tube, one of said side plates terminating forwardly in an alongated point in the plane of the bottom of the opened tube, the upper surface of said point being inclined upwardly and rearwardly to merge with the top of said side plates, the second of said plates terminating forwardly in a blunter point adapted to enter and assist in the opening initiated by the first point, and supplemental arm adapted to exteriorly engage and displace the edge of the collapsed tube.

15. In a machine of the character described, means for delivering collapsed tubes comprising end closing flaps one at a time to a tube opening station, means for holding said tubes during opening comprising members adapted for gripping engagement with said end flaps, means for opening a tube thus held comprising a tube shaped frame adapted to be inserted into the tube as it is opened, means for advancing said frame with a tube thereon to deliver said tube to a carrier with the end flaps thereof extending horizontally from the bottom, and means associated with said carrier for receiving and guiding said end flaps.

16. In a machine of the character described, means for opening collapsed tubes comprising end closing flaps and for delivering each tube as opened to a carrier bucket adapted by exterior engagement with the tube to prevent distortion and closing thereof, means associated with said carrier for receiving and guiding the forward end flap as the tube is delivered thereto, means for intermittently advancing said carrier, and means for guiding both of said end flaps during the intermittent advancing movement of said carrier.

17. In a machine of the character described, means for opening collapsed tubes having end closing flaps and for delivering each tube as opened to a carrier bucket in tube receiving position, means for advancing said carrier bucket step-by-step, means for guiding said end flaps during the advancing movements of said carrier, and feeler means for determining the presence of a tube in a carrier bucket one step removed from tube receiving position.

18. In a machine of the character described, means for delivering opened tubes one at a time to a bucket carrier, means for advancing said bucket carrier step-by-step, a belt conveyer adapted to receive and move a loaded tray into position for insertion into a tube in said carrier in tray-receiving position, means for shifting a tray from said conveyer into said tube in tray receiving position, means for detecting the presence of a tray in position for insertion into a tube, and means for preventing the movement of said tray inserting means in the absence of a tray.

19. In a machine of the character described, a carrier adapted to receive opened tubes at a tube receiving station, means for advancing said carrier step-by-step, a belt conveyer adapted to receive and move a loaded tray into position for insertion into a tube in said carrier in tube receiving position, means for shifting a tray from said conveyer into a tube in said carrier in tube receiving position, and means for seating articles in said tray prior to said shifting.

20. In a machine of the character described, a carrier adapted to receive opened tubes at a tube receiving station, means for advancing said carrier step-by-step, a belt conveyer adapted to receive and move a loaded tray into position for insertion into a tube in said carrier in tube receiving position, means for shifting a tray from said conveyer into a tube in said carrier in tube receiving position, means for seating articles in said tray prior to said shifting, and a guide associated with said carrier for depressing beneath the top of said tray the articles therein as the tray enters the tube.

21. In a machine of the character described, a carrier adapted to receive opened tubes and to transfer said tubes to a tray receiving position, means for detecting the presence of a tube approaching tray receiving position, a tray conveyer, means for shifting a tray from said conveyer into a tube in tray receiving position, means for detecting the presence of a tray in position to be thus shifted, and means for preventing the operation of the tray shifting means in the absence of either a tube or a tray.

22. In a machine of the character described, an intermittently moving tube carrier provided with tube receiving buckets comprising side flanges spaced to the exterior dimensions of a tube and having outwardly beveled ends, means for shifting a loaded tray into a tube in said carrier, and a retractable guide comprising inclined ends adapted to engage the beveled ends of said bucket flanges, thereby aligning the bucket and defining a passage for a tray being inserted into the tube.

23. In a machine of the character described, a carrier comprising a plurality of tube holding buckets adapted to be moved successively to tray receiving position, means for shifting a tray into the carrier bucket in tray receiving position, and means operable in conjunction with said tray shifting means to align and retain the carrier bucket in tray receiving position and to define a passage for the tray being shifted into the tube.

24. In a machine of the character described, an intermittently moving carrier comprising a series of tube receiving buckets adapted to be moved successively to tray-receiving position, a tray conveying belt adapted to move loaded trays successively into position to be shifted into a tube in tray receiving position, a reciprocating plunger adapted to engage a tray on said belt and shift it laterally therefrom into said tube, a guide interposed between said belt and said carrier and defining a passage for the tray being shifted, and means for advancing said guide concomitantly with said plunger to engage the tube holding bucket.

25. In a machine of the character described, a tube holding carrier, a tray conveying belt, means for shifting trays from said belt into a tube in said carrier, a guide defining a passage for the tray thus shifted, and operating means for said guide comprising a lost-motion connection to said tray shifting means.

26. In a machine of the character described, a tube holding carrier, a tray conveying belt, means for shifting a tray from said belt into a tube in said carrier comprising a spring actuated plunger, a tray guide joined to said plunger by a silp connection, and cam means for retracting said plunger and guide.

27. In a machine of the character described, a carrier comprising buckets adapted to receive tubes having end closing flaps, guide means associated with said carrier for retaining one of said flaps in a substantially horizontal position, guide means associated with said carrier for directing the second of said flaps downwardly, means for advancing said carrier to bring the tube therein to a tray receiving position and for inserting a tray therein while said second end flap is held in depressed position.

28. In a machine of the character described, a carrier comprising buckets adapted to receive tubes comprising end closing flaps, means for inserting a tray through one end of a tube held in said carrier while the adjacent end flap is held depressed, means for guiding said end flaps as the carrier is advanced to remove the tube and tray assembly from tray receiving position, means for creasing off the tip portions of said end flaps, and means for subsequently turning the end flaps upwardly and inserting the creased off tips beneath the tube top.

29. In a machine of the character described, an intermittently moving carrier comprising a series of buckets adapted to receive tubes comprising end flaps, means for intermittently moving said carrier to bring said buckets in succession opposite a plurality of operating stations, and means operable while said carrier is at rest for performing at successive stations along said carrier the operations of inserting a tube, detecting the presence of a tube, inserting a tray, creasing off the tips of the end flaps, closing the end flaps, and removing the closed package.

30. In a machine of the character described, a carrier adapted to receive tubes comprising end flaps, means for inserting loaded trays into the tubes in said carrier, means for advancing said carrier to bring the assemblies therein successively to a flap tip creasing station, means at said station for creasing off the tips of the end flaps, said creasing means comprising fixed depending members having edges adapted to engage said flaps at the crease line, and movable fingers adapted to bend said flaps around said edges.

31. In a machine of the character described, means for assembling a loaded tray into a tube comprising end flaps, and means for creasing off the tips of said end flaps comprising a fixed member having a crease defining edge and a movable member comprising a reentrant angle adapted to be advanced into contact with said edge, the end flap being confined between said fixed and movable members and the tip thereof being thereby sharply bent off from the remainder thereof.

32. In a machine of the character described, means for assembling loaded trays into tubes comprising end flaps, means for creasing off the tip portions of said end flaps comprising a yoke provided with crease-defining edges adapted for cooperation with said end flaps respectively, and movable members comprising reentrant angles adapted to be advanced into contact with said edges, the end flaps being confined between said members respectively.

33. In a machine of the character described, means for assembling loaded trays into tubes comprising end flaps, means for creasing off the tip portions of said end flaps comprising a yoke provided with crease-defining edges adapted for cooperation with said end flaps respectively, movable members comprising reentrant angles adapted to be advanced into contact with said edges, the end flaps being confined between said members respectively, and means for advancing said movable members simultaneously.

34. In a machine of the character described, means for assembling loaded trays into tubes comprising end flaps, means for creasing off the tip portions of said end flaps comprising a yoke provided with crease-defining edges adapted for cooperation with said end flaps respectively, movable members comprising reentrant angles adapted to be advanced into contact with said edges, the end flaps being confined between said members respectively, and means comprising intermeshing gears for advancing said movable members simultaneously.

35. In a machine of the character described, means for assembling a loaded tray into a tube comprising end closing flaps, means for creasing off the tip portions of said end flaps comprising a fixed abutment, and a member adapted for movement to carry said end flaps into contact with said abutment, said movable member and abutment comprising cooperating crease-defining portions.

36. In a machine of the character described, means for assembling a loaded tray into a tube comprising end closing flaps, means for creasing off the tip portions of said end flaps comprising a fixed abutment, a member adapted for movement to carry said end flap into contact with said abutment, said movable member and abutment comprising cooperating crease-defining portions, and a flexible member projecting from the face of said movable member adapted to first engage said end flap and initiate its movement to position for creasing.

37. In a machine of the character described, means for assembling loaded trays into tubes comprising end closing flaps, means for carrying said tubes from an assembly station to a flap bending station, a top rail supported above said carrying means, a yoke secured to said rail at said flap-bending station and comprising crease-defining edges adapted for cooperation with said end flaps respectively, and means adapted for simultaneous movement into cooperative engagement with said crease-defining edges to crease off the tip portions of said end flaps.

38. In a machine of the character described, means for assembling loaded trays into tubes comprising end closing flaps, means for creasing off the tip portions of said end flaps comprising a fixed member having crease-defining edges, a pair of arms comprising surfaces adapted for cooperation with said crease-defining edges, intermeshing pinions associated with said arms for causing simultaneous movement thereof; and means for advancing said arms comprising a lever depending from one of said arms, a link joined to said lever, an actuating spring, a retracting cam, and a yieldable connection from said link to said cam.

39. In a machine of the character described, means for assembling loaded trays into tubes comprising end closing flaps, means for creasing off the tip portions of said end flaps while the bodies thereof remain substantially in the plane of the tube bottom, means for turning said end flaps upwardly toward closing position, and means for finally positioning said end flaps in package closing position while inserting the creased off tips thereof beneath the tube top and above the tray.

40. In a machine of the character described, means for assembling loaded trays into tubes comprising end closing flaps, means for creasing off the tip portions of said end flaps while the bodies thereof remain substantially in the plane of the tube bottom, means for turning said end flaps upwardly toward closing position, means for finally positioning said end flaps in package closing position while inserting the creased off tips thereof beneath the tube top and above the tray, and means for finally seating articles in said tray beneath the top thereof immediately prior to the operation of inserting the end flaps.

41. In a machine of the character described, means for assembling loaded trays into tubes comprising end closing flaps, means for creasing off the tip portions of said end flaps while the bodies thereof remain substantially in the plane of the tube bottom, means for turning said end flaps upwardly toward closing position, a fixed abutment, means for moving said assembly into contact with said fixed abutment, and means for closing the package by inserting the end flaps beneath the tube top while the assembly is held in contact with said abutment.

42. In a machine of the character described, means for assembling loaded trays into tubes comprising end closing flaps, means for creasing off the tip portions of said end flaps while the bodies thereof remain substantially in the plane of the tube bottom, means for turning said end flaps upwardly toward closing position, a fixed abutment adapted to engage the mid-portion only of the top of the assembly, leaving the end portions free, means for moving said assembly into contact with said abutment, and means for inserting the end flaps while the assembly is held in contact with said abutment.

43. In a machine of the character described, means for assembling loaded trays into tubes comprising end closing flaps while said tubes are held in a bucket carrier, means for intermittently advancing said carrier to move said tube and tray assemblies first to a flap tip creasing station and subsequently to a package closing station, a top rail forming a partial housing for said carrier, means at said package closing station operating on said carrier to elevate the assembly thereon into engagement with said top rail, means at said package closing station operable to seat articles in the end portions of said tray beneath the top thereof, package closing means at said package closing station comprising a yoke secured to said top rail and provided with end flap bending surfaces, and cooperating package closing means comprising members movable simultaneously to carry said end flaps to package closing position.

44. In a machine of the character described, means for assembling loaded trays into tubes comprising end closing flaps, means for creasing off the tips of said flaps, and means for closing the package by turning the end flaps upwardly and inwardly beneath the tube top, said means comprising fixed curving guides adapted to direct said tips beneath the tube top and movable arms adapted to engage and move said flaps while in contact with said guide surfaces, said guides and movable arms comprising interspersed comb teeth.

45. In a machine of the character described, means for assembling loaded trays into tubes comprising end closing flaps, means for conveying the assembly to a package closing station, fixed end flap directing guides at said package closing station, and means at said package closing station for moving the assembly into a predetermined position with respect to said guides, for seating the articles in the end portions of said tray and for turning the end flaps upwardly and inwardly to package closing position.

46. In a machine of the character described, means for assembling loaded trays into tubes comprising end closing flaps, means for moving said assembly to a package closing station comprising a carrier, a fixed top rail housing said carrier, means at said package closing station for seating articles in the end portions of the tray, said means comprising a member pivoted in said top rail and having arms overlying the end portions of the package at the closing station and normally substantially in the plane of the undersurface of said top rail, and means for depressing said arms to seat articles in the end portions of said package.

47. In a machine of the character described, means for assembling loaded trays into tubes comprising end closing flaps; means for moving the assembly to a package closing station; and means at the package closing station for performing in sequence the operations of gripping the assembly in a predetermined position, seating articles in the end portions of the tray, turning the end flaps upwardly and inwardly while directing the tips thereof beneath the top of the tube and above the tray, and releasing said gripping means.

48. In a machine of the character described, a carrier, means for assembling and closing packages while in said carrier, means for removing assembled packages laterally from said carrier comprising an oscillating arm, and means for actuating said arm in such a manner that successive strokes thereof are of different length and alternate strokes are of identical length.

49. In a machine provided with devices for assembling and closing packages while held in a carrier, means for removing completed packages laterally from said carrier comprising a package removing arm adapted to deliver packages at different positions, and a package inverter device adapted to receive packages in any position to which they are delivered by said arm.

50. In a machine of the character described, a package inverting device comprising a package receiving trough connected to an arm, means for gripping laterally a package in said trough, means for moving the arm to invert said trough and the package therein, and means for actuating said gripping means to release said package while in inverted position.

51. In a machine of the character described, package inverting means comprising an oscillating arm provided with a package receiving trough, means for shifting said arm from a package receiving position to a package delivering position, means for delivering a package to said trough, a package gripping device, means for advancing said package gripping device after the delivery of a package to said trough and while said trough is in package receiving position and for retracting said gripper to release said package when the inverter has been moved to package delivering position.

52. In a machine of the character described, a package inverting device comprising a package receiving trough, gripping means adapted to engage and hold a package in said trough, and means for performing in sequence the operations of delivering a package to said trough, advancing said gripper to engage and hold said package, shifting said inverter to package delivering position, retracting said gripper to release the package, and restoring said inverter to package receiving position.

53. In a machine of the character described, an inverter device comprising a package receiving trough, means for delivering packages one at a time into said trough, successive packages being delivered to different longitudinal positions in said trough and alternate packages being delivered to identical positions, means for holding packages in either position in said trough, means for oscillating said inverter to a package delivering position and for releasing said package holding means, a moving belt adapted to receive the packages so delivered in positions transverse to said belt, guide means associated with the marginal portions of said belt adapted to engage end portions of the packages thereon and thereby turn said packages to positions longitudinal of said belt.

54. In a machine of the character described, means for assembling loaded trays into tubes comprising end closing flaps and for completing the package by closing said end flaps, said means comprising a carrier provided with individual package receiving compartments, means for intermittently advancing said carrier to bring compartments containing completed packages successively to a package removing station and for further advancing said carrier after package removal, means for detecting the presence of a package in a compartment in advance of the package removing station, and means for stopping the intermittent movement of said carrier in the event a package is in such compartment.

55. In a machine of the character described, means for assembling loaded trays into tubes comprising end closing flaps and for completing the package by closing said end flaps, said means comprising a carrier provided with individual package receiving compartments, means for intermittently advancing said carrier to bring compartments containing completed packages successively to a package removing station and for further advancing said carrier after package removal, means for detecting the presence of a package in a compartment in advance of the package removing station, and means for stopping the intermittent movement of said carrier in the event a package is in such compartment, said means comprising a feeler finger adapted to enter said compartment in the absence of a package and a latch bar controlled by said feeler finger.

56. A unitary machine comprising means for receiving a stack of collapsed tubes comprising end closing flaps, means for opening and shaping said tubes one at a time, means for receiving a series of loaded trays, means for assembling loaded trays into opened tubes, means for manipulating said end flaps to close and complete packages, means for inverting said packages, and means for delivering in line and in alternately reversed positions a series of packages thus prepared and assembled.

57. A unitary machine comprising means for receiving a stack of collapsed tubes comprising end closing flaps, means for opening and shaping said tubes one at a time, means for receiving a series of loaded trays, means for assembling loaded trays into opened tubes, means for manipulating said end flaps to close and complete packages, means for arranging said packages in alternately reversed positions, and a common driving mechanism for all of said means.

58. A unitary machine comprising means for receiving a stack of collapsed tubes comprising end closing flaps, means for opening and shaping said tubes one at a time, means for receiving a series of loaded trays, means for assembling loaded trays into opened tubes, means for manipulating said end flaps to close and complete packages, means for inverting said packages, means for arranging said packages in alternately reversed positions, and a common driving mechanism for all of said means, said common driving mechanism comprising a motor mounted on the machine, a shaft driven by said motor, a second shaft geared to the first shaft, and a third shaft geared to the second, and mechanism actuating and retracting devices secured to said shafts.

59. In a machine of the character described, drive mechanism comprising a constantly rotating shaft, a pinion driven by said shaft and loosely mounted on a second shaft, a clutch for engaging said pinion with said second shaft, means associated with said second shaft for performing a plurality of functions, a clutch controlling member actuated from said first shaft and operating to periodically disengage said clutch, and means for preventing the disengagement of said clutch by said disengaging means in the event that each of said plurality of functions has been completely performed.

60. In a machine of the character described, drive mechanism comprising a constantly rotating shaft, a pinion driven by said shaft and loosely mounted on a second shaft, a clutch for engaging said pinion with said second shaft, means associated with said second shaft for performing a plurality of functions, a clutch controlling member actuated from said first shaft and operating to periodically disengage said clutch, means for preventing the disengagement of said clutch by said disengaging means in the event that each of said plurality of functions has been completely performed, said means comprising a reciprocating bar and connections from said bar to said clutch controlling member to disengage said clutch when said bar fails to perform its complete movement, and means associated with each of said functions for engaging said bar to prevent its complete movement.

61. In a machine of the character described, means for assembling and closing packages, means for delivering said packages to a package inverting device reciprocating between a package receiving position and a package delivering position, and means for interrupting the operation of the machine in the event that the package inverting device fails to complete its movement to either package receiving or package delivering position.

62. In a machine of the character described, means for assembling and closing packages, means for delivering said packages to a package inverting device reciprocating between a package receiving position and a package delivering position, and means for interrupting the operation of the machine in the event that the package inverting device fails to complete its movement to either package receiving or package delivering position, said interrupting means comprising a lever provided with a clutch controlling surface and adapted to be displaced by said package inverter in one of its extreme positions and a second lever adapted to be displaced by said package inverter in the other of its extreme positions and joined to the first lever to effect displacement thereof.

63. In a machine of the character described, drive mechanism comprising a clutch, clutch controlling means comprising a reciprocating bar and so arranged that continued operation of the machine requires complete reciprocation of said bar and latch members cooperating with said notches to engage and hold said bar in the event of any one of a plurality of malfunctions associated with said latch members respectively, and means for moving said bar to permit disengagement of said latch members from said under-cut notches when the malfunction has been corrected, whereby normal operation of the machine is automatically resumed by the re-engagement of said clutch.

64. In a machine of the character described, means for opening collapsed tubes and transferring the opened tubes to a carrier, means for detecting the presence of opened tubes in said carrier, tray conveying means, means for detecting the presence of a tray in position to be assembled into a tube in said carrier, means for inserting a tray into a tube in said carrier, means for removing completed packages from said carrier, means for inverting the packages thus removed, a common drive mechanism for all of said means comprising a clutch, and clutch operating devices controllable by each of the aforesaid means to halt operation of the machine in the event of a malfunction of any of said means.

65. In a machine of the character described, means for opening collapsed tubes and transferring the opened tubes to a carrier, means for detecting the presence of opened tubes in said carrier, tray conveying means, means for detecting the presence of a tray in position to be assembled into a tube in said carrier, means for inserting a tray into a tube in said carrier, means for removing completed packages from said carrier, means for inverting the packages thus removed, a common drive mechanism for all of said means comprising a clutch, and clutch operating devices controllable by each of the aforesaid means to halt operation of the machine in the event of a malfunction of any of said means and to automatically resume operation when the malfunction has been corrected.

66. In a machine of the character described, a package inverter, means for delivering packages one at a time to said inverter, successive packages being delivered to different longitudinal positons in said inverter and alternate packages being delivered in identical positions therein, means for causing said inverter to deliver a package therein upsidedown with respect to the position in which said package was placed in said inverter, a conveyer for receiving packages delivered by said inverter, and package turning and guiding means associated with said conveyer; said inverter, conveyer and guide means cooperating to align a series of packages in laterally alternately reversed positions.

WARREN S. REYNOLDS.